(12) United States Patent
Li et al.

(10) Patent No.: US 11,804,883 B2
(45) Date of Patent: Oct. 31, 2023

(54) TRANSMISSION DIVERSITY ENHANCEMENT FOR UPLINK CONTROL CHANNEL

(71) Applicant: Qualcomm Incorporated, San Diego, CA (US)

(72) Inventors: Qiaoyu Li, Beijing (CN); Chao Wei, Beijing (CN); Yu Zhang, Beijing (CN); Liangming Wu, Beijing (CN); Chenxi Hao, Beijing (CN); Min Huang, Beijing (CN); Hao Xu, Beijing (CN); Wanshi Chen, San Diego, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/429,657

(22) PCT Filed: Feb. 6, 2020

(86) PCT No.: PCT/CN2020/074412
§ 371 (c)(1),
(2) Date: Aug. 10, 2021

(87) PCT Pub. No.: WO2020/168922
PCT Pub. Date: Aug. 27, 2020

(65) Prior Publication Data
US 2022/0123800 A1    Apr. 21, 2022

(51) Int. Cl.
*H04B 7/0456* (2017.01)
*H04B 7/0404* (2017.01)
(Continued)

(52) U.S. Cl.
CPC ......... *H04B 7/0456* (2013.01); *H04B 7/0404* (2013.01); *H04B 7/0408* (2013.01);
(Continued)

(58) Field of Classification Search
CPC .. H04B 7/0456; H04B 7/0404; H04B 7/0408; H04L 5/0007; H04L 5/0048; H04L 5/0091; H04W 72/0406; H04W 72/042
See application file for complete search history.

(56) References Cited

U.S. PATENT DOCUMENTS

| | | | |
|---|---|---|---|
| 2004/0087282 A1 | 5/2004 | Ishikawa | |
| 2014/0072065 A1 | 3/2014 | Nammi | |

(Continued)

FOREIGN PATENT DOCUMENTS

| | | | |
|---|---|---|---|
| CN | 103378937 A | 10/2013 | |
| CN | 108292941 A | 7/2018 | |

(Continued)

OTHER PUBLICATIONS

International Search Report and Written Opinion—PCT/CN2019/075589—ISA/EPO—dated Nov. 18, 2019.
(Continued)

*Primary Examiner* — Sophia Vlahos
(74) *Attorney, Agent, or Firm* — QUALCOMM Incorporated

(57) ABSTRACT

Methods, systems, devices, and apparatuses for wireless communications that support transmission diversity enhancement for uplink control channel are described. Generally, the described techniques provide for enhanced performance of an uplink control channel such as a physical uplink control channel (PUCCH) through the use of transmission diversity. In some cases, multiple input multiple output (MIMO) techniques may be supported for transmission of an uplink control channel for a given format suitable for transmission diversity enhancement. A resource block (RB) used in an uplink control channel transmission may contain a number of resource elements (REs) across one or more resource blocks. According to some aspects, a transmit diversity scheme may be employed at the RE level through (Continued)

application of different spatial precoders for different groups of REs of a given RB.

27 Claims, 23 Drawing Sheets

(51) Int. Cl.
    *H04B 7/0408*     (2017.01)
    *H04L 5/00*     (2006.01)
    *H04W 72/20*     (2023.01)

(52) U.S. Cl.
    CPC .......... *H04L 5/0007* (2013.01); *H04L 5/0048* (2013.01); *H04L 5/0091* (2013.01); *H04W 72/20* (2023.01)

(56) References Cited

U.S. PATENT DOCUMENTS

| | | | | |
|---|---|---|---|---|
| 2017/0150500 | A1* | 5/2017 | Ahn | H04W 74/08 |
| 2017/0245263 | A1* | 8/2017 | Li | H04L 5/001 |
| 2017/0311296 | A1* | 10/2017 | Onggosanusi | H04B 7/0456 |
| 2018/0199367 | A1* | 7/2018 | Jung | H04L 5/0091 |
| 2018/0248595 | A1* | 8/2018 | Chae | H04B 7/0473 |
| 2019/0020451 | A1* | 1/2019 | Zhang | H04B 7/0452 |
| 2019/0036653 | A1* | 1/2019 | Lunttila | H04W 36/0005 |
| 2019/0103941 | A1* | 4/2019 | Seo | H04L 1/0046 |
| 2020/0076484 | A1* | 3/2020 | Noh | H04B 7/0456 |
| 2020/0236700 | A1* | 7/2020 | Matsumura | H04W 72/1284 |
| 2021/0127422 | A1* | 4/2021 | Jiang | H04L 5/0055 |
| 2021/0144763 | A1* | 5/2021 | Park | H04L 1/1664 |
| 2021/0359735 | A1* | 11/2021 | Kim | H04B 7/0628 |

FOREIGN PATENT DOCUMENTS

| | | | |
|---|---|---|---|
| EP | 2731391 | A1 | 5/2014 |
| WO | WO-2012020331 | A1 | 2/2012 |
| WO | WO-2013073909 | A1 | 5/2013 |
| WO | WO-2013153276 | A1 | 10/2013 |

OTHER PUBLICATIONS

International Search Report and Written Opinion—PCT/CN2020/074412—ISA/EPO—dated Apr. 29, 2020.
ZTE: "On DMRS Port Association for Enhanced PDCCH", 3GPP TSG RAN WG1 Meeting #70, R1-123312, Aug. 17, 2012 (Aug. 17, 2012), pp. 1-8.
Ericsson: "On PUCCH Resource Allocation and Other Open Aspects", 3GPP TSG RAN WG1 Meeting NR#3, R1-1716590, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, 13 Pages, Sep. 12, 2017, XP051330121, the whole document.
Intel Corporation: "Transmit Diversity and Resource Allocation for PUCCH", 3GPP TSG RAN WG1 Meeting NR#3, R1-1716317 Intel TXD RA PUCCH, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, 8 Pages, Sep. 17, 2017, XP051339773, the whole document.
Qualcomm Incorporated: "Long PUCCH Over Multiple Slots", 3GPP TSG RAN WG1 Meeting 91, R1-1720684, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051370145, pp. 1-3, p. 2, the whole document.
Supplementary European Search Report—EP20759995—Search Authority—Munich—dated Oct. 12, 2022.
ZTE, et al., "Diversity based Uplink Transmission Schemes", 3GPP TSG RAN WG1 Meeting NR#3, R1-1715433, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, 3 Pages, Sep. 17, 2017, XP051338901, the whole document.

* cited by examiner

TRANSMISSION DIVERSITY ENHANCEMENT FOR UPLINK CONTROL CHANNEL

CROSS REFERENCE TO RELATED APPLICATIONS

The present Application is a 371 national phase filing of International Patent Application No. PCT/CN2020/074412 by L I et. al., entitled "TRANSMISSION DIVERSITY ENHANCEMENT FOR UPLINK CONTROL CHANNEL," filed Feb. 6, 2020; and to International Patent Application No. PCT/CN2019/075589 by L I et. al., entitled "TRANSMISSION DIVERSITY ENHANCEMENT FOR UPLINK CONTROL CHANNEL," filed Feb. 20, 2019, each of which is assigned to the assignee hereof, and each of which is expressly incorporated by reference in its entirety herein.

BACKGROUND

The following relates generally to wireless communications, and more specifically to transmission diversity enhancement for uplink control channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Uplink control information may be transmitted from a UE to a base station via an uplink control channel such as a physical uplink control channel (PUCCH). Uplink control information may include hybrid automatic repeat request (HARQ) feedback information, scheduling requests (SRs), channel state information (CSI) reports, or other control information. PUCCH may be transmitted using one or more physical resource blocks (RBs) and may be configured according to a number of different formats (e.g., PUCCH formats 0-4). A PUCCH transmitted by a UE to a base station may experience path loss or other issues which may decrease the likelihood of a successful decoding of the uplink control information carried by the PUCCH at the base station.

SUMMARY

The described techniques relate to improved methods, systems, devices, and apparatuses that support transmission diversity enhancement for uplink control channel. Generally, the described techniques provide for enhanced performance of an uplink control channel (e.g., a physical uplink control channel (PUCCH)) using transmission diversity. In some cases, multiple input multiple output (MIMO) techniques may be supported for transmission of a PUCCH for a given format (e.g., PUCCH format 2). PUCCH format 2 utilizes a multi-carrier orthogonal frequency division multiplexing (OFDM) waveform that may be suitable for both frequency and time domain diversity enhancement. Other PUCCH formats or uplink control channel configurations (e.g., those that utilize multiple carriers or OFDM waveforms) may also be suitable for transmission diversity enhancement.

Each resource block used in a PUCCH transmission may contain a number of resource elements (REs) across one or more resource blocks (RBs). According to some aspects, a transmit diversity scheme may be employed at the RE level through application of different spatial precoders for different groups of REs of a given RB. For example, a user equipment (UE) may transmit uplink control information via an uplink control channel by applying a first spatial precoder to a first group of REs on a given RB and a different spatial precoder to a second group of REs on the same RB. Additionally or alternatively, a number of different precoders (e.g., 2, 3, 4, 6, 9) may be applied to respective groups of REs of an RB or across multiple RBs.

A method of wireless communications at a UE is described. The method may include identifying a resolution level and a diversity level for an uplink control channel, precoding information for transmission via the uplink control channel based on the resolution level and the diversity level, and transmitting, via the uplink control channel, an OFDM waveform generated based on the precoded information.

An apparatus for wireless communications at a UE is described. The apparatus may include a processor, memory in electronic communication with the processor, and instructions stored in the memory. The instructions may be executable by the processor to cause the apparatus to identify a resolution level and a diversity level for an uplink control channel, precode information for transmission via the uplink control channel based on the resolution level and the diversity level, and transmit, via the uplink control channel, an OFDM waveform generated based on the precoded information.

Another apparatus for wireless communications at a UE is described. The apparatus may include means for identifying a resolution level and a diversity level for an uplink control channel, precoding information for transmission via the uplink control channel based on the resolution level and the diversity level, and transmitting, via the uplink control channel, an OFDM waveform generated based on the precoded information.

A non-transitory computer-readable medium storing code for wireless communications at a UE is described. The code may include instructions executable by a processor to identify a resolution level and a diversity level for an uplink control channel, precode information for transmission via the uplink control channel based on the resolution level and the diversity level, and transmit, via the uplink control channel, an OFDM waveform generated based on the precoded information.

In some examples of the method, apparatuses, and non-transitory computer-readable medium described herein, precoding the information for transmission further may include operations, features, means, or instructions for identifying a set of control channel payload resource element groups within a resource block based on the resolution level and the diversity level, and applying a different spatial precoder to a respective subset of the information that may be mapped to a respective control channel payload resource element group of the set of control channel payload resource element groups.

Some examples of the method, apparatuses, and non-transitory computer-readable medium described herein may further include operations, features, means, or instructions for identifying, based on the diversity level, a number of the set of control channel payload resource element groups within the resource block, and generating the OFDM waveform based on the number.

Some examples of the method, apparatuses, and non-transitory computer-readable medium described herein may further include operations, features, means, or instructions for identifying, based on the resolution level, a mapping pattern that indicates that resource elements of different groups of the set of control channel payload resource element groups may be interleaved within the resource block, and generating the OFDM waveform based on the mapping pattern.

Some examples of the method, apparatuses, and non-transitory computer-readable medium described herein may further include operations, features, means, or instructions for identifying, based on the resolution level, a mapping pattern that indicates that resource elements of different groups of the set of control channel payload resource element groups may be mapped to distinct sets of contiguous resource elements within the resource block, and generating the OFDM waveform based on the mapping pattern.

In some examples of the method, apparatuses, and non-transitory computer-readable medium described herein, precoding the information for transmission further may include operations, features, means, or instructions for precoding a first subset of the information that may be mapped to a first control channel payload resource element group of a set of control channel payload resource element groups within a resource block using a first spatial precoder of a set of spatial precoders, and precoding a second subset of the information that may be mapped to a second control channel payload resource element group of the set of control channel payload resource element groups using a second spatial precoder of the set of spatial precoders that differs from the first spatial precoder.

Some examples of the method, apparatuses, and non-transitory computer-readable medium described herein may further include operations, features, means, or instructions for identifying a number of demodulation reference signal ports based on the diversity level, identifying, based on the number of demodulation reference signal ports, a mapping pattern that maps at least one demodulation reference signal to at least one resource element within each control channel payload resource element group of a set of control channel payload resource element groups within a resource block, and generating the OFDM waveform based on the mapping pattern.

Some examples of the method, apparatuses, and non-transitory computer-readable medium described herein may further include operations, features, means, or instructions for determining a precoding pattern for a set of demodulation reference signals within each control channel payload resource element group of a set of control channel payload resource element groups based on the resolution level, and generating the OFDM waveform based on the precoding pattern.

In some examples of the method, apparatuses, and non-transitory computer-readable medium described herein, identifying the resolution level and the diversity level further may include operations, features, means, or instructions for receiving an indication of the resolution level and the diversity level.

In some examples of the method, apparatuses, and non-transitory computer-readable medium described herein, the indication may be received via a radio resource control (RRC) message, downlink control information (DCI), or a physical downlink control channel (PDCCH).

In some examples of the method, apparatuses, and non-transitory computer-readable medium described herein, the uplink control channel may be a PUCCH.

Some examples of the method, apparatuses, and non-transitory computer-readable medium described herein may further include operations, features, means, or instructions for identifying a cycling pattern for the uplink control channel, and generating the OFDM waveform for transmission over a set of transmission time intervals based on the cycling pattern.

In some examples of the method, apparatuses, and non-transitory computer-readable medium described herein, identifying the cycling pattern further may include operations, features, means, or instructions for receiving an indication of the cycling pattern.

In some examples of the method, apparatuses, and non-transitory computer-readable medium described herein, precoding the information further may include operations, features, means, or instructions for cycling, based on the cycling pattern, which spatial precoder of a set of different spatial precoders may be mapped to a respective control channel payload resource element group of a set of control channel payload resource element groups in each transmission time interval of the set of transmission time intervals.

In some examples of the method, apparatuses, and non-transitory computer-readable medium described herein, the cycling pattern may be a time domain cycling pattern, a frequency domain cycling pattern, or a time and frequency domain cycling pattern.

In some examples of the method, apparatuses, and non-transitory computer-readable medium described herein, transmitting the OFDM waveform may include operations, features, means, or instructions for transmitting the OFDM waveform in a single transmission time interval or two transmission time intervals.

Some examples of the method, apparatuses, and non-transitory computer-readable medium described herein may further include operations, features, means, or instructions for identifying an uplink control channel format for the uplink control channel, and generating the OFDM waveform based on the uplink control channel format.

In some examples of the method, apparatuses, and non-transitory computer-readable medium described herein, identifying the uplink control channel format for the uplink control channel may include operations, features, means, or instructions for receiving an indication of the uplink control channel format.

Some examples of the method, apparatuses, and non-transitory computer-readable medium described herein may further include operations, features, means, or instructions for transmitting an indication of a set of spatial precoders applied for precoding the information.

A method of wireless communications at a base station is described. The method may include identifying a resolution level and a diversity level for an uplink control channel and monitoring the uplink control channel for an OFDM waveform generated based on information precoded according to the resolution level and the diversity level.

An apparatus for wireless communications at a base station is described. The apparatus may include a processor, memory in electronic communication with the processor, and instructions stored in the memory. The instructions may be executable by the processor to cause the apparatus to identify a resolution level and a diversity level for an uplink control channel and monitor the uplink control channel for an OFDM waveform generated based on information precoded according to the resolution level and the diversity level.

Another apparatus for wireless communications at a base station is described. The apparatus may include means for identifying a resolution level and a diversity level for an uplink control channel and monitoring the uplink control channel for an OFDM waveform generated based on information precoded according to the resolution level and the diversity level.

A non-transitory computer-readable medium storing code for wireless communications at a base station is described. The code may include instructions executable by a processor to identify a resolution level and a diversity level for an uplink control channel and monitor the uplink control channel for an OFDM waveform generated based on information precoded according to the resolution level and the diversity level.

Some examples of the method, apparatuses, and non-transitory computer-readable medium described herein may further include operations, features, means, or instructions for transmitting an indication of the resolution level and the diversity level.

In some examples of the method, apparatuses, and non-transitory computer-readable medium described herein, the indication may be transmitted via an RRC message, DCI, or a PDCCH.

In some examples of the method, apparatuses, and non-transitory computer-readable medium described herein, the uplink control channel includes a PUCCH.

Some examples of the method, apparatuses, and non-transitory computer-readable medium described herein may further include operations, features, means, or instructions for transmitting an indication of a cycling pattern for the uplink control channel, where monitoring of the uplink control channel for the OFDM waveform may be based on the cycling pattern.

In some examples of the method, apparatuses, and non-transitory computer-readable medium described herein, the cycling pattern may be a time domain cycling pattern, a frequency domain cycling pattern, or a time and frequency domain cycling pattern.

Some examples of the method, apparatuses, and non-transitory computer-readable medium described herein may further include operations, features, means, or instructions for identifying a cycling pattern for the uplink control channel, and receiving the OFDM waveform over a set of transmission time intervals based on the cycling pattern.

Some examples of the method, apparatuses, and non-transitory computer-readable medium described herein may further include operations, features, means, or instructions for determining, based on the cycling pattern, which spatial precoder of a set of different spatial precoders may be mapped to a respective control channel payload resource element group of a set of control channel payload resource element groups in each transmission time interval of the set of transmission time intervals.

In some examples of the method, apparatuses, and non-transitory computer-readable medium described herein, monitoring the uplink control channel for the OFDM waveform may include operations, features, means, or instructions for monitoring a single transmission time interval or two transmission time intervals for the OFDM waveform.

Some examples of the method, apparatuses, and non-transitory computer-readable medium described herein may further include operations, features, means, or instructions for transmitting an indication of an uplink control channel format, where the monitoring of the uplink control channel for the OFDM waveform may be based on the uplink control channel format.

Some examples of the method, apparatuses, and non-transitory computer-readable medium described herein may further include operations, features, means, or instructions for receiving an indication of a set of spatial precoders applied for precoding the information, and generating a channel estimate for the uplink control channel based on the indication of the set of spatial precoders.

DETAILED DESCRIPTION

Multiple input multiple output (MIMO) techniques may enhance transmission quality and signal strength at reception points within a wireless system. Certain MIMO techniques such as those implementing transmission diversity may enhance the performance and/or increase the likelihood of a successful decoding of a transmitted signal (e.g., an uplink control signal). An uplink control channel such as a physical uplink control channel (PUCCH) may convey various uplink control information (UCI) to a network. UCI may include hybrid automatic repeat request acknowledgement (HARQ) feedback, scheduling requests, channel state information (CSI) reports, and other information. In addition, the network may configure PUCCH into a number of formats defined by various characteristics such as waveform type and transmission duration. In some examples, certain PUCCH formats (e.g., PUCCH format 2) may utilize a multi-carrier orthogonal frequency division multiplexing (OFDM) waveform to support both frequency domain and time domain transmission diversity enhancement.

Each resource block (RB) or number of RBs used in a PUCCH transmission may contain a number of resource elements (REs). A number of REs located at an RB may be allocated into a number of subsets or groups (e.g., control channel payload RE groups, PUCCH payload RE groups). In some cases, the number and configuration of the control channel payload RE groups may be indicated by a mapping pattern or diversity level. In some cases, a transmit diversity scheme may be applied at the RE level through application of different spatial precoders for different control channel payload RE groups of a given RB. In one example, a user equipment (UE) may transmit UCI via an uplink control channel by applying a first spatial precoder to a first group of REs on a given RB, and may apply a second spatial precoder to a second group of REs on the given RB. Additionally or alternatively, a number of different precoders may be applied to respective groups of REs across a given RB or number of RBs. The application of a number of different precoders at the RE level for a single RB or multiple RBs may allow for greater transmission diversity of the signal. Different precoding techniques may direct a transmission according to different transmission paths, which may in some cases reduce various multipath or other signal fading effects at a receiver.

A UE may apply a number of different spatial precoding schemes to different time and frequency resources during beamforming and transmission of the uplink control channel. In some examples, precoding may be based on information in an identified resolution level and diversity level. In some cases, precoders may be cyclically applied to groups of REs based on a cycling pattern or a mapping pattern. Precoding may further be based on the number and configuration of control channel payload RE groups at a given RB.

Figure 1:
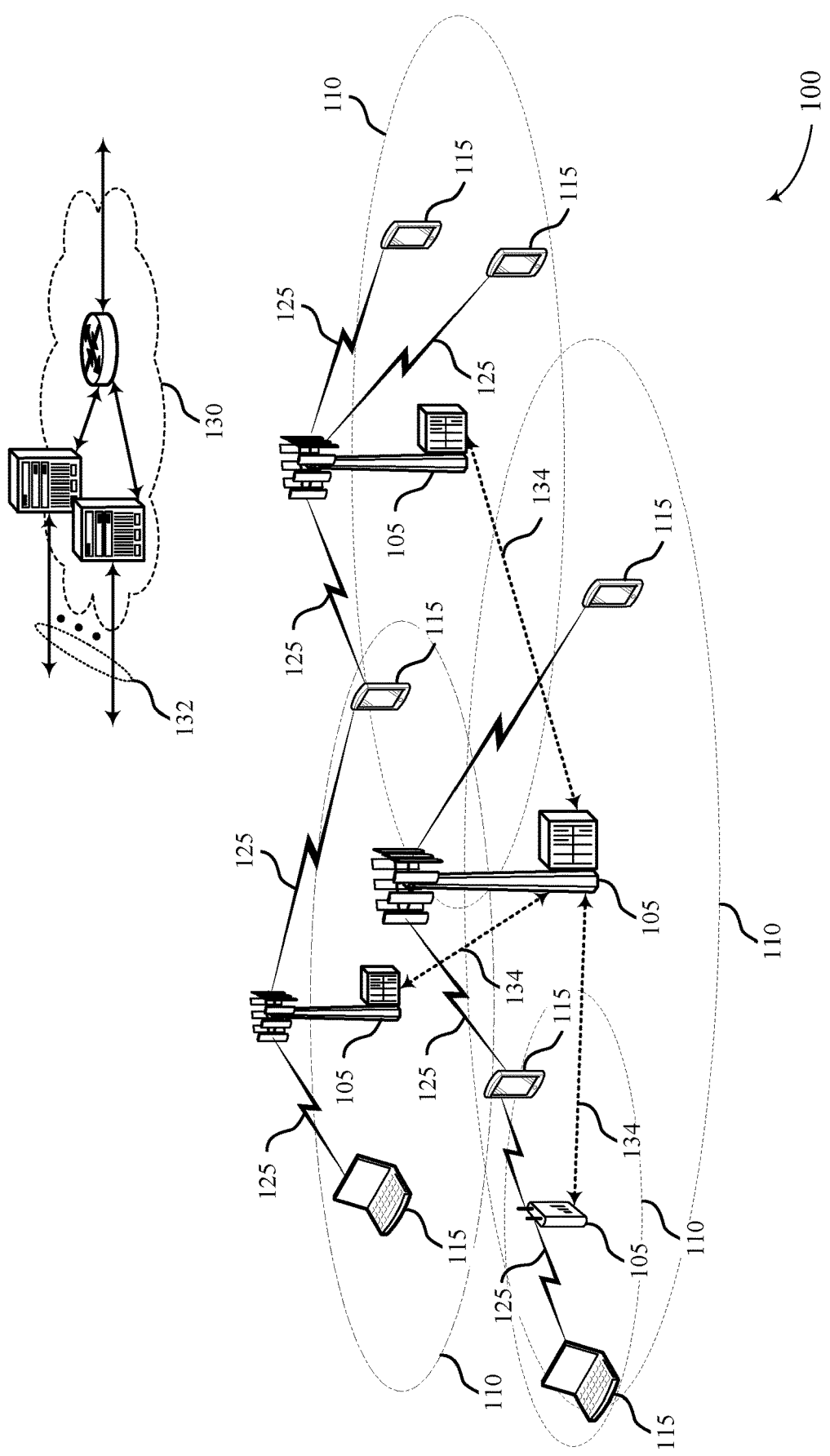
FIG. 1 illustrates an example of a wireless communications system that supports transmission diversity enhancement for uplink control channel in accordance with aspects of the present disclosure.

FIG. 1 illustrates an example of a wireless communications system 100 that supports transmission diversity enhancement for uplink control channel in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In wireless communications system 100, a UE 115 may employ a number of techniques directed to transmission diversity enhancement for an uplink control channel. The described techniques relate to improved methods, systems, devices, and apparatuses that support transmission diversity enhancement for uplink control channel. In some cases, UE 115 may implement MIMO techniques to transmit signals over an uplink control channel of a given format (e.g., PUCCH format 2). UE may select an uplink control channel format which supports a multi-carrier OFDM waveform suitable for both frequency and time domain transmission diversity enhancement.

Each RB or number of RBs configured for a PUCCH transmission may contain a number of REs, which may be further allocated into groups or subsets (e.g., uplink control channel payload groups). A transmit diversity scheme may be employed at the RE level through application of different spatial precoders for different groups of REs of a given RB. According to some aspects, UE 115 may identify a diversity level associated with a number of RE groups, and may further identify a resolution level associated with a number of spatial precoders to apply to a given RB. In one example, UE 115 may transmit uplink control information via an uplink control channel by applying a first spatial precoder to a first group of REs on a given RB and a different spatial precoder to a second group of REs on the same RB. The UE 115 may transmit the uplink control information via an OFDM waveform based on the precoded information. Additional transmission and precoding schemes may exist, for example, a number of different precoders (e.g., 2, 3, 4, 6, 9) may be applied to respective groups of REs of an RB or across multiple RBs.

Enhancing transmission diversity schemes for uplink control channel transmissions in a wireless system may include further precoding and beamforming techniques to support transmission of multiple data streams associated with multi-layer transmissions. Such techniques may enhance the quality of received signals, and may further increase the likelihood that a signal is successfully received at a target receiver.

Figure 2:
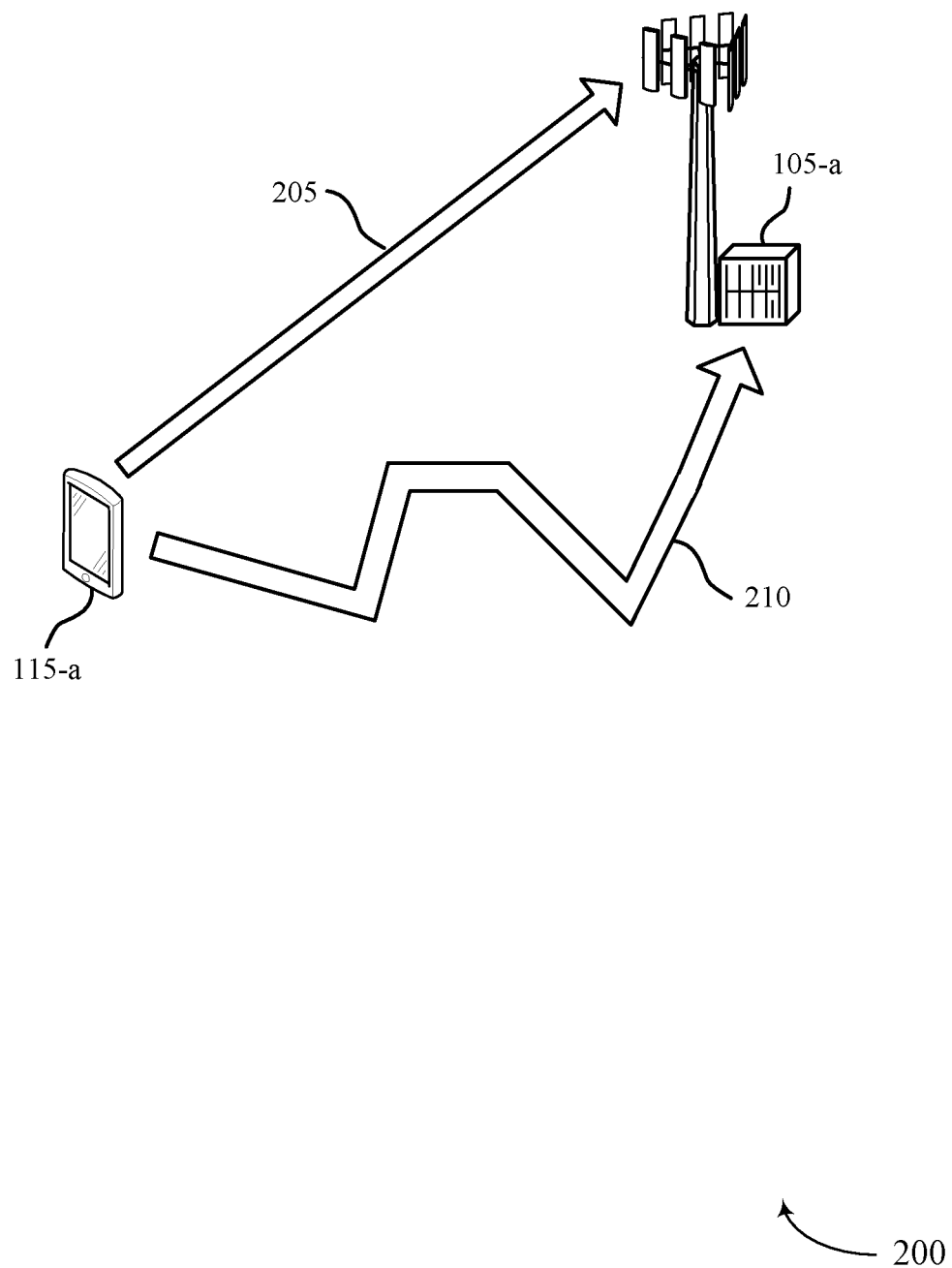
FIG. 2 illustrates an example of a wireless communications system that supports transmission diversity enhancement for uplink control channel in accordance with aspects of the present disclosure.

FIG. 2 illustrates an example of a wireless communications system 200 that supports transmission diversity enhancement for uplink control channel in accordance with aspects of the present disclosure. In some examples, wireless communications system 200 may implement aspects of wireless communications system 100. For example, wireless communications system 200 includes UE 115-*a* and base station 105-*a*, which may be examples of the corresponding devices described with reference to FIG. 1. Wireless communications system may support enhanced transmission diversity for transmissions associated with various data channels in a wireless network.

Devices within wireless communications system 200 such as UE 115-*a* and base station 105-*a* may utilize a number of channels to transmit information. One example of a channel may be a control channel, such as a PUCCH, which a UE 115-*a* may use to transmit various types of UCI. In some cases, a control channel such as the PUCCH may contain HARQ feedback, scheduling request information, periodic channel state information (P-CSI) reporting information including channel quality indicators (CQIs), and so on.

In one example, employing transmission diversity may include techniques in which signal transmissions are directed along a number of different transmission paths, which may increase the likelihood of successful reception at an associated receiver. For example, UE 115-a may transmit duration PUCCH containing up to 2 OFDM symbols, although other numbers of OFDM symbols are possible. PUCCH formats 0-4 may be defined in Table 1:

TABLE 1

| PUCCH Format | Length in Number of OFDM Symbols | Number of UCI Bits | Waveform | Description |
| --- | --- | --- | --- | --- |
| 0 | 1-2 | ≤2 | CSG seq | Short PUCCH with 1-2 bits UCI |
| 1 | 4-14 | ≤2 | CSG seq | Long PUCCH with 1-2 bits UCI (TD-OCC) |
| 2 | 1-2 | >2 | OFDM | Short PUCCH with >2 bits UCI |
| 3 | 4-14 | >2 | DFT-S-OFDM | Long PUCCH with >2 bits UCI with no multiplexing capability |
| 4 | 4-14 | >2 | DFT-S-OFDM | Long PUCCH with >2 bits UCI with multiplexing capability | signals (e.g., a PUCCH) that emanate in different directions and thereby may traverse different transmission paths 205 and/or 210 to base station 105-a. To do so, the UE 115-a may configure a transmit antenna or antenna array to perform a transmission of the PUCCH (e.g., PUCCH payload, which may be allocated across one or more REs, RBs, or RE groups) directed along multiple transmission paths (e.g., transmission path 205 or transmission path 210). In some cases, the signal (or the portion of the signal) transmitted along transmission path 205 may experience different interference or pathloss as compared to the signal (or the portion of the signal) transmitted along transmission path 210. For example, the signal directed toward transmission path 210 may experience a number of losses during propagation to base station 105-a. Such multi-path losses may be due to a number of signal fading affects such as reflection, scattering, diffraction, interference, and so on. The signal associated with transmission path 205, however, may not experience as much loss during propagation to base station 105-a.

The base station 105-a may receive information (e.g., PUCCH payload) from one or both transmission paths 205 and 210, where the signal strength associated with transmission path 210 may be less than that of the signal propagated along transmission path 205 (e.g., due to multipath losses). However, initial transmission diversity (e.g., transmitting data along multiple transmission paths instead of a single transmission path) may increase the likelihood of base station 105-a successfully receiving the initial signal along transmission path 205 with limited multipath losses. Enhancing transmission diversity schemes for data channel transmissions in a wireless system may include implementing a number of different beamforming techniques to support transmission of multiple data streams associated with multi-layer transmissions.

Techniques herein may provide transmission diversity for PUCCH. A UE 115-a may transmit PUCCH at the end of a system bandwidth or time slot using one or more physical RBs. Each RB may contain a number of REs, for example, one RB may contain up to 12 REs. A PUCCH transmission may be configured according to one of a number of different formats (e.g., 5 formats), and each format may be associated with a number of parameters including, for example, transmission duration, UCI bit composition, and waveform type. A PUCCH may in some cases be transmitted using a number of different waveforms. For example, a PUCCH payload may be transmitted using a sequence-based closed subscriber group (CSG) waveform, a single-carrier OFDM waveform, or a multi-carrier OFDM waveform. In addition, a PUCCH transmission may be a long duration PUCCH containing up to 14 OFDM symbols, or may be a short A UE 115-a may transmit a PUCCH using any one of PUCCH formats 0-4. In some cases, however, enhancements to transmission diversity may be limited depending on a number of parameters associated with the PUCCH format. For example, UE 115-a may transmit a PUCCH using formats 3 or 4 which be limited to time domain transmission enhancements due to preconfigured single carrier waveforms. In another example however, UE 115-a may transmit PUCCH using format 2, which may support both time and frequency domain transmission enhancements. Other PUCCH formats may provide similar time and frequency domain transmission enhancements.

In the example of PUCCH format 2, a multi-carrier OFDM waveform may support both frequency and time domain transmission diversity (e.g., enhancements to transmission diversity in both frequency and time domains). A UE 115-a may use a number of different spatial precoders during beamforming and transmission of PUCCH for various time and frequency resources. The number of different spatial precoders may be identified by a diversity level, which may be configured by the network. A spatial precoder may weight a stream of data associated with a PUCCH transmission such that the PUCCH may be transmitted in accordance with a number of different transmission paths, such as transmission paths 210 and 205.

Further, a number of precoders may be applied to the time and frequency resources in a number of different configurations. In one example, a wireless device or network may apply one spatial precoder to one time or frequency RE within a given RB. In some examples, a UE 115-a may apply a number of spatial precoders to a number of subsets of time or frequency REs within an RB. The number of subsets of REs per RB (e.g., PUCCH payload RE groups) may be indicated by a resolution level. Applying spatial precoders per RE may allow more coherent channel estimation on resources associated with the same spatial precoders at base station 105-a. For example, UE 115-a may transmit a PUCCH precoded according to the precoding techniques described herein. Base station 105-a may receive the PUCCH transmitted by the UE 115-a and may decode the PUCCH based on the precoding. Decoding may involve a post coding process where the base station 105-a identifies the transmit diversity scheme for the PUCCH (e.g., including the resolution level and diversity level), performs channel estimation based on a demodulation reference signal (DMRS) of the PUCCH, and decodes the PUCCH based on the precoding techniques used for precoding the PUCCH and the channel estimation.

In some cases, the network (e.g., base station 105-a) may configure a transmission resolution or diversity level for the UE 115-a. Further, the network device may send a first portion of the configuration in RRC, and may send a second portion of the configuration in DCI. In cases where the network sends the configuration using RRC, the RRC may be configured during a PUCCH resource or a PUCCH resource set. In cases where the network sends the configuration using DCI, the DCI may be configured during CSI reporting or during scheduling PUCCH resources for ACK/NACK regarding a physical downlink shared channel (PDSCH).

A wireless device such as UE 115-a may apply a number of different spatial precoding schemes to different time and frequency resources during beamforming and transmission of an uplink control channel. In some examples, precoding may be based on information in an identified resolution level and diversity level. In other examples, UE 115-a may apply a first precoder to a first subset of REs in an RB, and may apply a second precoder to a second subset of REs in an RB. In some cases, UE 115-a may cyclically apply precoders to groups of REs based on a cycling pattern. In some cases, the cycling pattern may identify which spatial precoder of a number of spatial precoders to apply to subsets of REs over one or multiple RBs. For example, a cycling pattern may identify two spatial precoders to apply to alternating groups of REs. In another example, a different cycling pattern may identify four spatial precoders to apply to alternating groups of REs, and so on. In other cases, UE 115-a may apply precoders to groups of REs based on a mapping pattern, which may be used to determine which spatial precoder of a number of spatial precoders may be mapped to respective RE groups. For example, the mapping pattern may map a first precoder to a first and third group of REs and may map a second precoder to a second and fourth group of REs. Various examples of cycling and mapping patterns may be described in reference to configurations detailed in FIGS. 3-5.

In some examples, a mapping pattern may indicate different groups of control channel payload REs which are interleaved within the RB, as described with reference to FIGS. 3-5. For instance, interleaving of different groups of control channel payload REs may refer to a contiguous or non-contiguous relationship between REs within a group. For example, a first subset of REs of a first group of REs may be separated from a second subset of REs of the first group of REs by REs associated with a different (e.g., second) group of REs (e.g., REs within the first group may be associated with a set of non-contiguous subcarriers in the frequency domain). In some cases, groups of REs may be interleaved in an alternating fashion where a subset of REs of a first group is adjacent to one or more subsets of REs of a second group in the frequency domain.

Contiguous REs may refer to a set of adjacent REs within an RB, which may have consecutive RE index numbers. For example, a set of REs may be considered contiguous if the REs in the set span consecutive subcarriers in the frequency domain.

In some cases, UE 115-a may determine a precoding pattern for a set of DMRSs within each control channel payload RE group based on the resolution level. The precoding pattern for the set of DMRSs may refer to the mapping of a first set of DMRSs associated with a first precoder to REs within an RB, a second set of DMRSs associated with a second precoder to REs within an RB, and so on.

Techniques for enhancing transmission diversity in an uplink control channel may implement aspects of a MIMO wireless system, and may utilize multiple antennas during the transmission and/or reception of signals. In some cases spatial multiplexing or spatial precoding may include sending multiple data streams to wireless devices within a network. In some cases, UE 115-a may estimate a downlink channel and may report a recommended rank indicator (RI) to base station 105-a. UE 115-a may also report a channel quality indicator (CQI) and a precoding matrix indicator (PMI) to base station 105-a. Upon receiving information from the UE 115-a, base station 105-a may determine scheduling or precoding configuration information.

Figure 3:
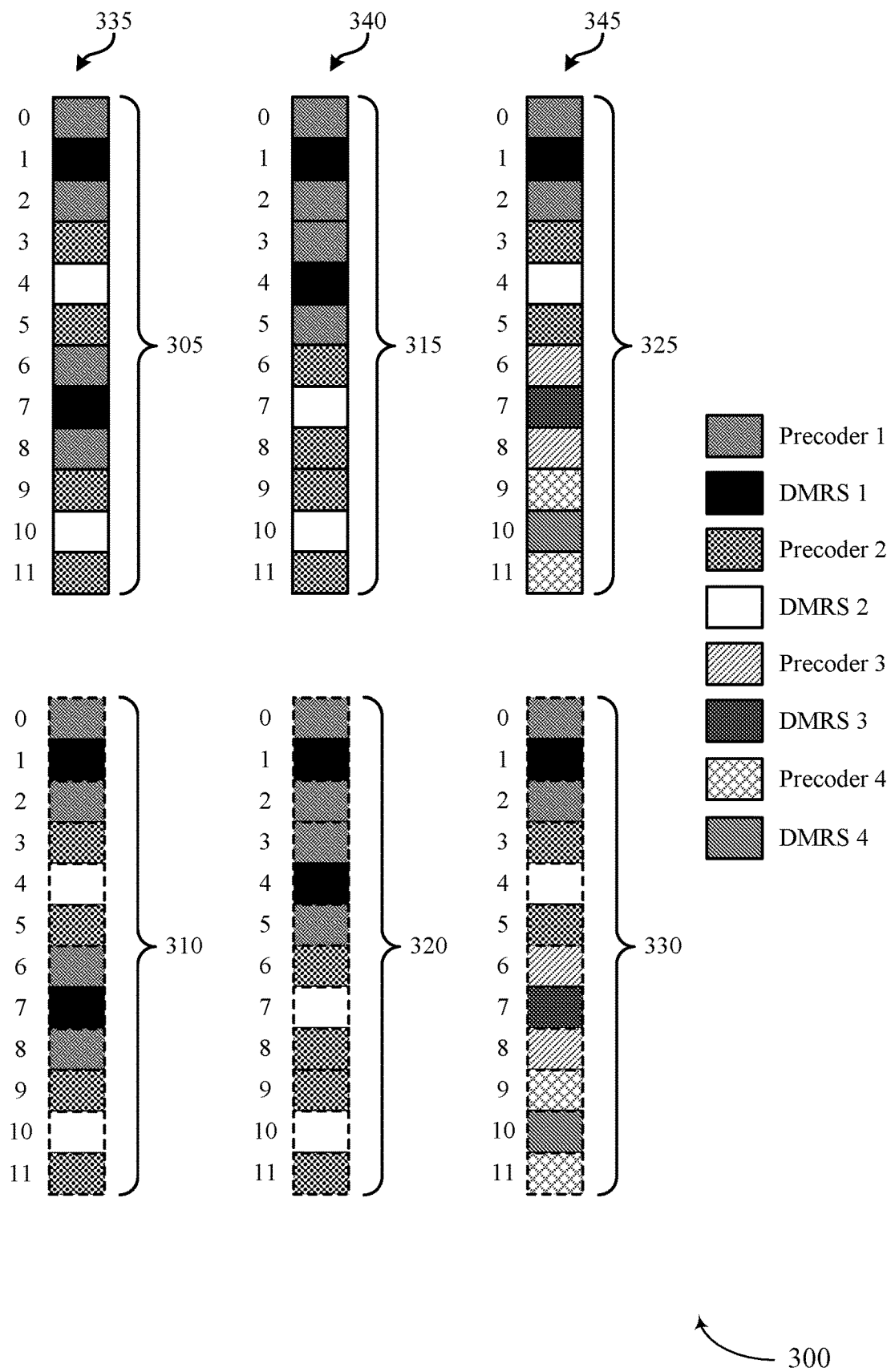
FIG. 3 illustrates example resource block (RB) configurations that support transmission diversity enhancement for uplink control channel in accordance with aspects of the present disclosure.

FIG. 3 illustrates example RB configurations 300 that support transmission diversity enhancement for uplink control channel in accordance with aspects of the present disclosure. In some examples, RB configurations 300 may implement aspects of wireless communications systems 100 or 200. A wireless device such as a base station or core network node may configure an RB or a number of RBs containing one OFDM symbol period using a number of techniques, and may further identify a number of factors such as a resolution and diversity level used to identify various precoding schemes for transmission.

A wireless communications system may establish a number of different configurations of spatial precoders to resources for a control channel transmission. A wireless device (e.g., a UE) within the system may apply the different configurations to RBs 305, 315, and 325, which may include information for a PUCCH in accordance with PUCCH format 2. A number of precoders (identified by a diversity level) may be applied to a number of PUCCH payload RE groups (identified by a resolution level) within a single RB containing one OFDM symbol period.

In one example, REs 0-11 of RB 305 may be allocated or assigned to a number of PUCCH payload groups containing 3 REs each (e.g., REs 0, 1, and 2 form a first group, REs 3, 4, and 5 form a second group, REs 6, 7, and 8 form a third group, and REs 9, 10, and 11 form a fourth group, such that RB 305 contains 4 PUCCH payload RE groups). The wireless device may then cycle different precoders between PUCCH payload RE groups. For a 2× diversity level (e.g., 2 spatial precoders), the wireless device may apply precoder 1 to the first and third PUCCH payload RE group (e.g., REs 0, 1, 2, and REs 6, 7, 8), and may apply precoder 2 to the second and fourth PUCCH payload RE group (e.g., REs 3, 4, 5, and REs 9, 10, 11). Precoder cycling may occur in the time domain in examples containing only one OFDM symbol period 335.

In addition to REs containing PUCCH payload information, a number of REs associated with a number of demodulation reference signals (DMRSs) may be included in RB 305. In the above example, 2 DMRS ports may be included (e.g., REs 1 and 7 may use DMRS 1, and REs 4 and 10 may use DMRS 2) such that the number of DMRS REs is distributed evenly among the PUCCH payload RE groups, or such that the ratio of the number of DMRS REs to the total number of REs per PUCCH payload RE group is ½. Precoding may be applied to each DMRS corresponding to an associated precoder as applied to the PUCCH payload RE group to which the DMRS is allocated. For instance, DMRS 1 may be precoded using precoder 1 and DMRS 2 may be precoded using precoder 2. Similar precoding techniques may be utilized for multiple RBs, such as RB 310. For example, a wireless device may apply precoding techniques to generate an OFDM waveform across multiple RBs (e.g., RBs 305 and 310) based on the precoding, and the wireless device may transmit the generated OFDM waveform using the multiple RBs.

In some cases, precoding may be applied at a lower resolution for a given RB (e.g., precoding may be applied to an RB having a lower number of PUCCH payload groups). Lower resolution precoding techniques may be associated with lower device implementation complexity (e.g., due to larger bandwidths used for a single precoder) and may be used by devices with resource, power, or processing constraints.

For example, an RB 315 spanning one OFDM symbol period 340 may contain REs 0-11 allocated to a number of PUCCH payload groups containing 6 REs each (e.g., REs 0, 1, 2, 3, 4, and 5 form a first group, and REs 6, 7, 8, 9, 10, and 11 form a second group, such that the RB contains 2 PUCCH payload RE groups). The wireless device may cycle different precoders 1 and 2 between the PUCCH payload RE groups. For a 2× diversity level (e.g., 2 spatial precoders), the wireless device may apply precoder 1 to the first PUCCH payload RE group (e.g., REs 0, 1, 2, 3, 4, and 5), and may apply precoder 2 to the second PUCCH payload RE group (e.g., REs 6, 7, 8, 9, 10, and 11).

In this example, a number of DMRS REs may be evenly distributed among the PUCCH payload RE groups such that the ratio of the number of DMRS REs to the total number of REs per PUCCH payload RE group is ½. Two DMRS ports may be included (e.g., REs 1 and 4 may use DMRS 1, and REs 7 and 10 may use DMRS 2), each of which may be precoded according to a respective precoder. For instance, DMRS 1 may be precoded using precoder 1 and DMRS 2 may be precoded using precoder 2. Similar precoding techniques may be utilized for multiple RBs, such as RB 320. For example, a wireless device may apply precoding techniques to generate an OFDM waveform across multiple RBs (e.g., RBs 315 and 320) based on the precoding, and the wireless device may transmit the generated OFDM waveform using the multiple RBs.

In another example, an RB 325 spanning one OFDM symbol period 345 may contain REs allocated to a number of PUCCH payload groups containing 3 REs each (e.g., REs 0, 1, and 2 form a first group, REs 3, 4, and 5 form a second group, REs 6, 7, and 8 form a third group, and REs 9, 10, and 11 form a fourth group such that the RB contains 4 PUCCH payload RE groups). The wireless device may then cycle different precoders between PUCCH payload RE groups. For a 4× diversity level (e.g., 4 spatial precoders), the wireless device may apply precoder 1 to a first PUCCH payload RE group (e.g., REs 0, 1, and 2), may apply precoder 2 to a second PUCCH payload RE group (e.g., REs 3, 4, and 5), may apply precoder 3 to a third PUCCH payload RE group (e.g., REs 6, 7, and 8), and may apply precoder 4 to a fourth PUCCH payload RE group (e.g., REs 9, 10, and 11).

In addition to REs containing PUCCH payload information, a number of REs associated with DMRSs may be included in RB 325. In the above example, 4 DMRS ports may be included (e.g., RE 1 may use a DMRS1, RE 4 may use a DMRS 2, RE 7 may use a DMRS 3, and RE 10 may use DMRS 4). The number of DMRS REs are distributed evenly among the PUCCH payload RE groups, or such that the ratio of the number of DMRS REs to the total number of REs per PUCCH payload RE group is ½. The number of DMRS ports may increase in examples where diversity level (e.g., number of precoders applied to the RB 325) increases. Precoding may be applied to each DMRS corresponding to an associated precoder as applied to the PUCCH payload RE group to which the DMRS is allocated. For instance, DMRS 1 may be precoded using precoder 1, DMRS 2 may be precoded using precoder 2, DMRS 3 may be precoded using precoder 3, and DMRS 4 may be precoded using precoder 4. Similar precoding techniques may be utilized for multiple RBs, such as RB 330. For example, a wireless device may apply precoding techniques to generate an OFDM waveform across multiple RBs (e.g., RBs 325 and 330) based on the precoding, and the wireless device may transmit the generated OFDM waveform using the multiple RBs.

Figure 4:
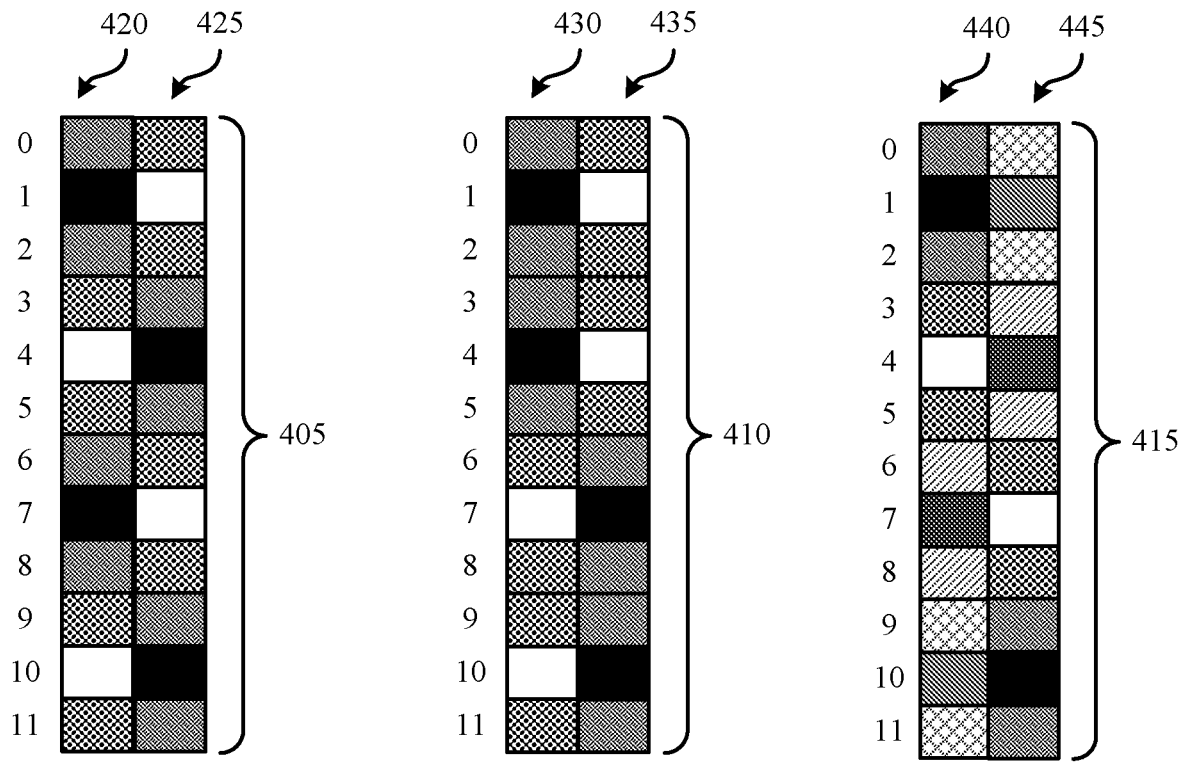
FIG. 4 illustrates example RB configurations that support transmission diversity enhancement for uplink control channel in accordance with aspects of the present disclosure.
Figure 4:
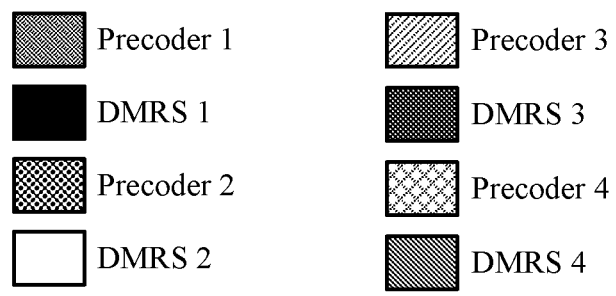

FIG. 4 illustrates example various RB configurations 400 that support transmission diversity enhancement for uplink control channel in accordance with aspects of the present disclosure. In some examples, RB configurations 400 may implement aspects of wireless communications systems 100 or 200. A wireless device (e.g., a UE) may configure an RB or a number of RBs across two or more OFDM symbol periods using a number of techniques, and may further identify a number of factors such as a resolution and diversity level used to identify various precoding schemes for transmission.

A wireless device may establish a number of different configurations of spatial precoders to resources for a data channel transmission and apply the different configurations to RBs for transmissions, for example RBs 405, 410, and 415. In some cases, a wireless device may transmit a PUCCH in accordance with PUCCH format 2. A number of precoders (identified by a diversity level) may be applied to a number of PUCCH payload RE groups (identified by a resolution level) within a single RB spanning multiple (e.g., two) OFDM symbol periods. The wireless device may then apply time domain cycling in addition to frequency domain cycling to cycle different spatial precoders between the PUCCH payload RE groups. Adjacent RE groups may cycle to a different precoder, and spatial precoders may cycle on both time and frequency domains per RE group.

For an RB 405, for example, REs 0-11 may be allocated to a number of PUCCH payload groups containing 3 REs each (e.g., REs 0, 1, and 2 form a first group, REs 3, 4, and 5 form a second group, REs 6, 7, and 8 form a third group, and REs 9, 10, and 11 form a fourth group, such that RB 405 contains 4 PUCCH payload RE groups). For a 2× diversity level (e.g., 2 spatial precoders), in OFDM symbol period 420, the wireless device may apply a precoder 1 to the first and third PUCCH payload RE groups (e.g., REs 0, 1, 2 and 6, 7, 8), and may apply a precoder 2 to the second and fourth PUCCH payload RE groups (e.g., REs 3, 4, 5 and 9, 10, 11). In a OFDM symbol period 425, the wireless device may apply precoder 2 to the first and third PUCCH payload RE groups (e.g., REs 0, 1, 2 and 6, 7, 8), and may apply the precoder 1 to the second and fourth PUCCH payload RE groups (e.g., REs 3, 4, 5 and 9, 10, 11).

In addition to REs containing PUCCH payload information, a number of REs associated with DMRSs may be included in RB 405. In such examples, two DMRS ports may be used, and the ports used may cycle per DMRS-RE group. In OFDM symbol period 420, for example, REs 1 and 7 may use DMRS 1, and REs 4 and 10 may use DMRS 2. In OFDM symbol period 425, REs 1 and 7 may use DMRS 2, and REs 4 and 10 may use DMRS 1. Additionally, the number of DMRS REs may be distributed evenly among the PUCCH payload RE groups, or such that the ratio of the number of DMRS REs to the total number of REs per PUCCH payload RE group is ½.

In another example, REs included in RB 410 may be allocated to a number of PUCCH payload groups containing 6 REs each (e.g., REs 0, 1, 2, 3, 4, and 5 form a first group, and REs 6, 7, 8, 9, 10, and 11 form a second group such that the RB 410 contains 2 PUCCH payload RE groups). For 2× diversity (e.g., 2 spatial precoders), in OFDM symbol period 430, the wireless device may apply precoder 1 to the first PUCCH payload RE group (e.g., REs 0, 1, 2, 3, 4, and 5), and may apply precoder 2 to the second PUCCH payload RE group (e.g., REs 6, 7, 8, 9, 10, and 11). In OFDM symbol period 435, the wireless device may apply the precoder 2 to the first PUCCH payload RE group (e.g., REs 0, 1, 2, 3, 4, and 5), and may apply precoder 1 to the second PUCCH payload RE group (e.g., REs 6, 7, 8, 9, 10, and In such examples, two DMRS ports may be used, and the ports used may cycle per DMRS-RE group. For the OFDM symbol period 430, for example, REs 1 and 4 may use DMRS 1, and REs 7 and 10 may use a DMRS 2. For OFDM symbol period 435, REs 1 and 4 may use DMRS 2, and REs 7 and 10 may use DMRS 1. Additionally, the number of DMRS REs may be distributed evenly among the PUCCH payload RE groups, or such that the ratio of the number of DMRS REs to the total number of REs per PUCCH payload RE group is ½.

In another example, REs included in RB 415 may be allocated to a number of PUCCH payload groups containing 3 REs each (e.g., REs 0, 1, and 2 form a first group, REs 3, 4, and 5 form a second group, REs 6, 7, and 8 form a third group, and REs 9, 10, and 11 form a fourth group such that the RB contains 4 PUCCH payload RE groups). For a 4× diversity level (e.g., 4 spatial precoders), in OFDM symbol period 440, the wireless device may apply a precoder 1 to the first PUCCH payload RE group (e.g., REs 0, 1, 2), may apply a precoder 2 to the second PUCCH payload RE group (e.g., REs 3, 4, 5), may apply precoder 3 to the third PUCCH payload RE group (e.g., REs 6, 7, 8), and may apply precoder 4 to the fourth PUCCH payload RE group (e.g., REs 9, 10, 11). In OFDM symbol period 445, for example, the wireless device may apply precoder 4 to the first PUCCH payload RE group (e.g., REs 0, 1, 2), may apply precoder 3 to the second PUCCH payload RE group (e.g., REs 3, 4, 5), may apply precoder 2 to the third PUCCH payload RE group (e.g., REs 6, 7, 8), and may apply precoder 1 to the fourth PUCCH payload RE group (e.g., REs 9, 10, 11).

In such examples, four DMRS ports may be used, and the ports used may cycle per DMRS-RE group. For OFDM symbol period 440, for example, RE 1 may use DMRS 1, RE 4 may use DMRS 2, RE 7 may use DMRS 3, and RE 10 may use DMRS 4. For OFDM symbol period 445, RE 1 may use DMRS 4, RE 4 may use DMRS 3, RE 7 may use DMRS 2, and RE 10 may use DMRS 1. Additionally, the number of DMRS REs may be distributed evenly among the PUCCH payload RE groups, or such that the ratio of the number of DMRS REs to the total number of REs per PUCCH payload RE group is ½.

The network may provide additional configurations for PUCCH transmissions including different spatial precoder cycling for multiple RBs across two or more OFDM symbol periods. Further, the network may determine configurations for both time domain and frequency domain cycling, and numerous associated cycling patterns. For example, the network may determine that a first and second OFDM symbol period may use the same precoder and DMRS RE pattern, among other configurations.

Figure 5:
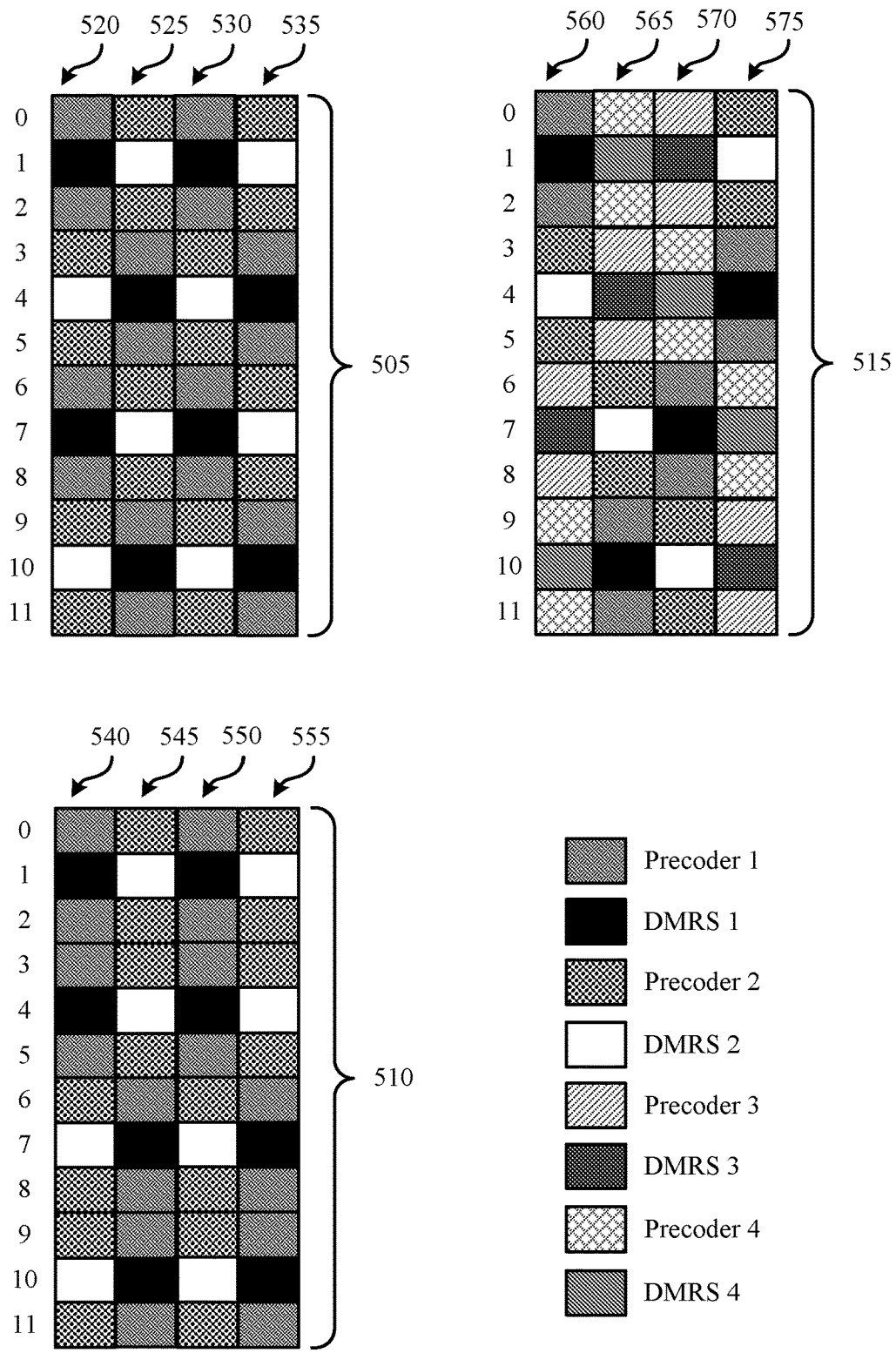
FIG. 5 illustrates example RB configurations that support transmission diversity enhancement for uplink control channel in accordance with aspects of the present disclosure.

FIG. 5 illustrates example RB configurations 500 that support transmission diversity enhancement for uplink control channel in accordance with aspects of the present disclosure. In some examples, RB configurations 500 may implement aspects of wireless communications systems 100 or 200. A wireless device may configure an RB or a number of RBs across multiple (e.g., 2, 3, 4, 7, 10) OFDM symbol periods using a number of techniques, and may further identify a number of factors such as a resolution level and a diversity level to identify various precoding schemes for transmission.

A wireless device may establish a number of different configurations of spatial precoders to resources for a data channel transmission and may apply the different configurations to RBs for transmissions, for example RBs 505, 510, and 515. In some cases, a wireless device may transmit data associated with a PUCCH in accordance with PUCCH format 2. A number of precoders (identified by a diversity level) may be applied to a number of PUCCH payload RE groups (identified by a resolution level) within a single RB or multiple RBs across multiple OFDM symbol periods. The techniques used for configuring 2 OFDM symbol periods may be extended to include more symbols, for example 4 OFDM symbols.

In some cases, various time and frequency cycling techniques similar to those used for an RB over 2 OFDM symbol periods such as those described with reference to FIG. 3 may be extended to an RB over 4 OFDM symbol periods. In such examples, symbols and corresponding precoder configurations are cycled in the frequency domain and again in the time domain. Introducing a greater number of symbol periods may introduce a greater number of configurations for the formats of the cycled RBs. As in previous examples, the network may indicate a configuration for the wireless device to use for transmission. In addition, similar cycling techniques may be applied to other channels including PDSCH, physical downlink control channel (PDCCH), PUSCH, along with other possible PUCCH formats.

In a first example, RB 505 may contain a number of REs. REs 0-11 may be allocated to a number of PUCCH payload groups containing 3 REs each (e.g., REs 0, 1, and 2 form a first group, REs 3, 4, and 5 form a second group, REs 6, 7, and 8 form a third group, and REs 9, 10, and 11 form a fourth group such that the RB 505 contains 4 PUCCH payload RE groups). For a 2× diversity level (e.g., 2 spatial precoders), in OFDM symbol periods 520 and 530, the wireless device may apply precoder 1 to the first and third PUCCH payload RE groups (e.g., REs 0, 1, 2 and 6, 7, 8), and may apply precoder 2 to the second and fourth PUCCH payload RE group (e.g., REs 3, 4, 5 and 9, 10, 11). In OFDM symbol periods 525 and 535, the wireless device may apply precoder 2 to the first and third PUCCH payload RE group (e.g., REs 0, 1, 2 and 6, 7, 8), and may apply precoder 1 to the second and fourth PUCCH payload RE group (e.g., REs 3, 4, 5 and 9, 10, 11).

In such examples, two DMRS ports may be used, and the ports used may cycle per DMRS-RE group. For OFDM symbol periods 520 and 530, for example, REs 1 and 7 may use DMRS 1, and REs 4 and 10 may use DMRS 2. For OFDM symbol periods 525 and 535, REs 1 and 7 may use DMRS 2, and REs 4 and 10 may use DMRS 1. Additionally, the number of DMRS REs may be distributed evenly among the PUCCH payload RE groups, or such that the ratio of the number of DMRS REs to the total number of REs per PUCCH payload RE group is ½.

In another example, RB 510 may include a number of REs. REs 0-11 may be allocated into a number of PUCCH payload groups containing 6 REs each (e.g., REs 0, 1, 2, 3, 4, and 5 form a first group, and REs 6, 7, 8, 9, 10, and 11 form a second group such that the RB 510 contains 2 PUCCH payload RE groups). For a 2× diversity level (e.g., 2 spatial precoders), in OFDM symbol periods 540 and 550, the wireless device may apply precoder 1 to the first PUCCH payload RE group (e.g., REs 0, 1, 2, 3, 4, and 5), and may apply precoder 2 to the second PUCCH payload RE group (e.g., REs 6, 7, 8, 9, 10, and 11). In OFDM symbol periods 545 and 555, the wireless device may apply precoder 2 to the first PUCCH payload RE group (e.g., REs 0, 1, 2, 3, 4, and 5), and may apply precoder 1 to the second PUCCH payload RE group (e.g., REs 6, 7, 8, 9, 10, and 11).

In such examples, two DMRS ports may be used, and the ports used may cycle per DMRS-RE group. For OFDM symbol periods 540 and 550, for example, REs 1 and 4 may use a DMRS 1, and REs 7 and 10 may use DMRS 2. For OFDM symbol periods 545 and 555, REs 1 and 4 may use the DMRS 2, and REs 7 and 10 may use DMRS 1.

Additionally, the number of DMRS REs may be distributed evenly among the PUCCH payload RE groups, or such that the ratio of the number of DMRS REs to the total number of REs per PUCCH payload RE group is ½.

In another example, RB 515 may contain a number of REs. REs 0-11 may be allocated into a number of PUCCH payload groups containing 3 REs each (e.g., REs 0, 1, and 2 form a first group, REs 3, 4, and 5 form a second group, REs 6, 7, and 8 form a third group, and REs 9, 10, and 11 form a fourth group such that RB 515 contains 4 PUCCH payload RE groups). For a 4× diversity level (e.g., 4 spatial precoders), in OFDM symbol period 560, for example, the wireless device may apply precoder 1 to the first PUCCH payload RE group (e.g., REs 0, 1, 2), may apply precoder 2 to the second PUCCH payload RE group (e.g., REs 3, 4, 5), may apply precoder 3 to the third PUCCH payload RE group (e.g., REs 6, 7, 8), and may apply precoder 4 to the fourth PUCCH payload RE group (e.g., REs 9, 10, 11). In OFDM symbol period 565, for example, the wireless device may apply precoder 4 to the first PUCCH payload RE group (e.g., REs 0, 1, 2), may apply precoder 3 to the second PUCCH payload RE group (e.g., REs 3, 4, 5), may apply precoder 2 to the third PUCCH payload RE group (e.g., REs 6, 7, 8), and may apply precoder 1 to the fourth PUCCH payload RE group (e.g., REs 9, 10, 11). In OFDM symbol period 570, for example, the wireless device may apply precoder 3 to the first PUCCH payload RE group (e.g., REs 0, 1, 2), may apply precoder 4 to the second PUCCH payload RE group (e.g., REs 3, 4, 5), may apply precoder 1 to the third PUCCH payload RE group (e.g., REs 6, 7, 8), and may apply precoder 2 to the fourth PUCCH payload RE group (e.g., REs 9, 10, 11). In OFDM symbol period 575, for example, the wireless device may apply precoder 2 to the first PUCCH payload RE group (e.g., REs 0, 1, 2), may apply precoder 1 to the second PUCCH payload RE group (e.g., REs 3, 4, 5), may apply precoder 4 to the third PUCCH payload RE group (e.g., REs 6, 7, 8), and may apply precoder 3 to the fourth PUCCH payload RE group (e.g., REs 9, 10, 11)

In such examples, four DMRS ports may be used, and the ports used may cycle per DMRS-RE group. For OFDM symbol period 560, for example, RE 1 may use DMRS 1, RE 4 may use DMRS 2, RE 7 may use DMRS 3, and RE 10 may use DMRS 4. For OFDM symbol period 565, for example, RE 1 may use DMRS 4, RE 4 may use DMRS 3, RE 7 may use DMRS 2, and RE 10 may use DMRS 1. For OFDM symbol period 570, for example, RE 1 may use DMRS 3, RE 4 may use DMRS 4, RE 7 may use DMRS 1, and RE 10 may use DMRS 2. For OFDM symbol period 575, for example, RE 1 may use DMRS 2, RE 4 may use DMRS 1, RE 7 may use DMRS 4, and RE 10 may use DMRS 3. Additionally, the number of DMRS REs may be distributed evenly among the PUCCH payload RE groups, or such that the ratio of the number of DMRS REs to the total number of REs per PUCCH payload RE group is ½.

Figure 6:
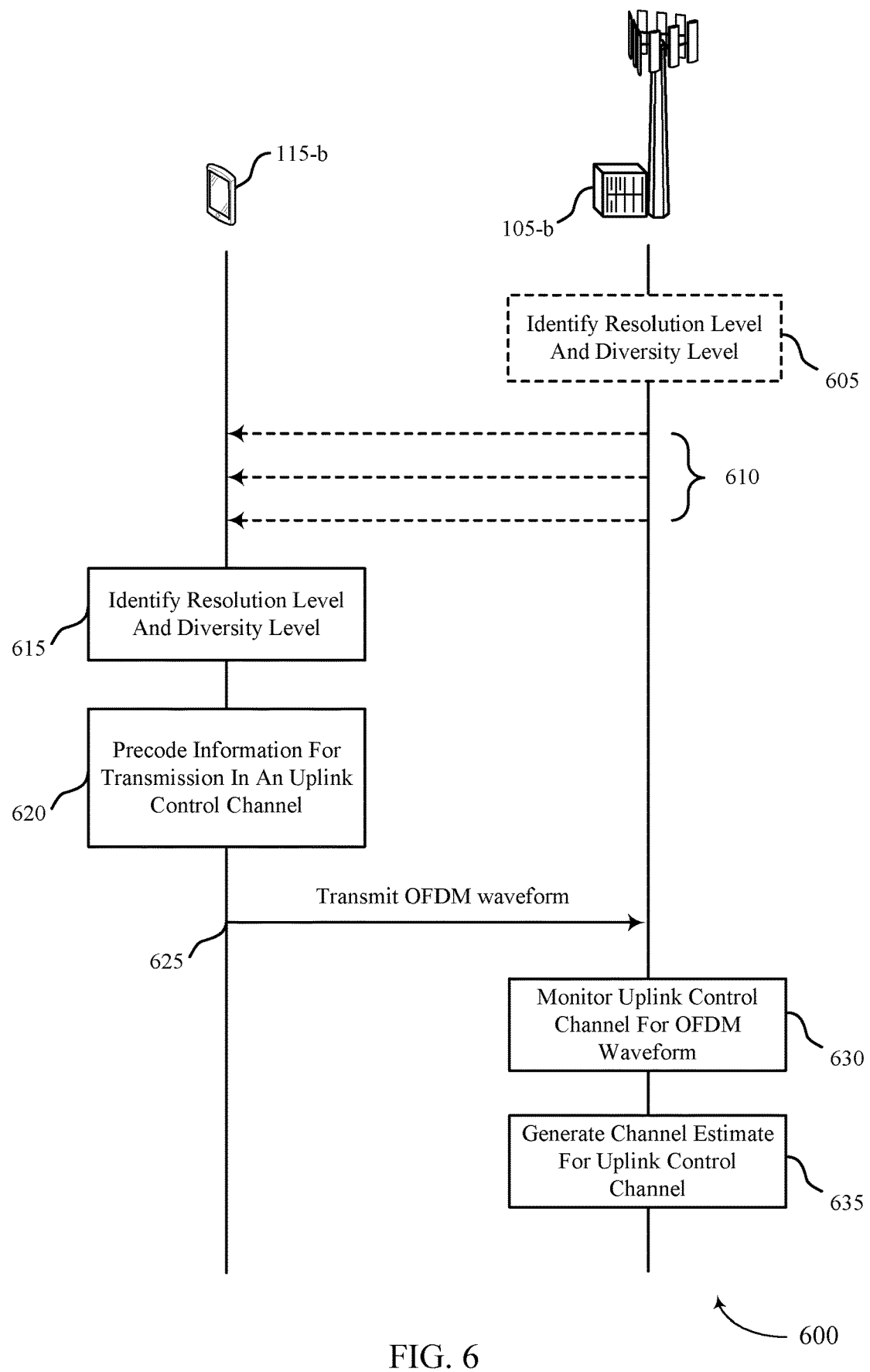
FIG. 6 illustrates an example of a process flow that supports transmission diversity enhancement for uplink control channel in accordance with aspects of the present disclosure.

FIG. 6 illustrates an example of a process flow 600 in a system that supports transmission diversity enhancement for uplink control channel. In some examples, process flow 600 may implement aspects of wireless communications systems 100 or 200. Process flow 600 may include base station 105-*b* and UE 115-*b*, which may be respective examples of a base station 105 and a UE 115 as described herein. In some cases, UE 115-*b* and base station 105-*b* may establish a number of different configurations for RBs including assigning a number of spatial precoders to a number of resources for a PUCCH transmission.

At 605, base station 105-*b* may identify a resolution level and a diversity level for an uplink control channel. In some cases, the resolution level may be associated with a number of uplink control channel RE groups (e.g., PUCCH payload RE groups) allocated for an RB, and the diversity level may be associated with a number of precoders applied to the number of uplink control channel RE groups.

At 610, base station 105-*b* may optionally transmit an indication of the resolution level and the diversity level to UE 115-*b*. The indication may in some examples be transmitted via an RRC message, a PDCCH, or as DCI. Additionally or alternatively, at 610, base station 105-*b* may optionally transmit an indication of a cycling pattern for the uplink control channel to UE 115-*b*. In some examples, the cycling pattern may be a time domain cycling pattern, a frequency domain cycling pattern, or a time and frequency domain cycling pattern. Additionally or alternatively, at 610, base station 105-*b* may optionally transmit an indication of an uplink control channel format to UE 115-*b*. In some examples, the uplink control channel may include a PUCCH, or any may be any other uplink channel.

At 615, UE 115-*b* may identify a resolution level and a diversity level for the uplink control channel, which may be identified based on the optionally transmitted indications at 610. In some examples, identifying the diversity level may include identifying a number of control channel payload REs within an RB (e.g., a number of PUCCH payload RE groups). Further, identifying the diversity level may include identifying a number of DMRS ports associated with the number of control channel payload RE groups. In some examples, identifying the resolution level may include identifying a mapping pattern which may indicate different groups of control channel payload REs which are interleaved within the RB. In other examples, identifying the resolution level may include identifying a mapping pattern which may indicate different groups of control channel payload REs are mapped to distinct sets of contiguous REs within the RB.

At 620, UE 115-*b* may precode information for transmission via the uplink control channel based on the identified resolution level and diversity level. In some examples, precoding the information for transmission may include identifying a number of control channel payload RE groups within a given RB based on the resolution level and the diversity level, and applying a different spatial precoder to a respective subset of the information that is mapped to a respective control channel payload RE group. In other examples, precoding the information for transmission may include precoding a first subset of the information that is mapped to a first control channel payload RE group within a given RB using a first spatial precoder, and precoding a second subset of the information that is mapped to a second control channel payload RE group using a second spatial precoder that differs from the first spatial precoder. In some cases, UE 115-*b* may determine a precoding pattern for a set of DMRSs within each control channel payload RE group based on the resolution level.

At 620, UE 115-*b* may identify a cycling pattern for the uplink control channel, which it may use to determine which spatial precoder of a number of spatial precoders may be mapped to a respective control channel payload RE group.

In some examples, the cycling pattern may be a time domain cycling pattern. In other examples, the cycling pattern may be a frequency domain cycling pattern. In further examples, the cycling pattern may be a time and frequency domain cycling pattern.

At 625, UE 115-*b* may generate and transmit an OFDM waveform based on the precoded information at 620. UE 115-*b* may generate the OFDM waveform based on a number of factors, including a number of control channel RE groups within an RB, a mapping pattern, a precoding pattern, a cycling pattern, an uplink control channel format, and so on. In addition, UE 115-*b* may transmit the OFDM waveform based on a number of factors including the precoded information, an indicated number of transmission time intervals, and so on.

At 630, base station 105-*b* may monitor the uplink control channel for the OFDM waveform based on a number of factors. In some examples, base station 105-*b* may monitor the uplink channel for the OFDM waveform based on the determined cycling pattern, or the uplink control channel format. Base station 105-*b* may monitor for the OFDM waveform in a single transmission time interval or more than one transmission time intervals. In some cases, monitoring for the OFDM waveform may include receiving an indication of a number of spatial precoders applied to precode transmission information at UE 115-*b*.

At 635, base station 105-*b* may generate a channel estimate for the uplink control channel based on information received in the OFDM waveform. For example, base station 105-*b* may generate a channel estimate based on an indication of the number of spatial precoders applied to transmission information at UE 115-*b*. In some cases, the number of spatial precoders and associated parameters for each of the spatial precoders may be indicated to base station 105-*b* through signaling received from the UE 115-*b*, a node of the core network (e.g., core network 130 of FIG. 1), or any other node in the wireless communications system. Additionally or alternatively, the base station 105-*b* may determine or identify the number of spatial precoder through a look up table or in accordance with a set of defined protocols (e.g., a standard).

In some examples, the base station 105-*b* may use the channel estimate generated at 635 in order to demodulate and decode the OFDM waveform transmitted by the UE 115-*b*. The base station 105-*b* may, in some cases, send feedback information to the UE 115-*b* based on the decoding of the OFDM waveform. For instance, if the base station 105-*b* successfully decodes the PUCCH transmitted by the UE 115-*b*, the base station 105-*b* may transmit a HARQ acknowledgement (HARQ-ACK) message indicating that decoding was successful, and the base station 105-*b* may communicate with the UE 115-*b* based on the information obtained from decoding the PUCCH. If the base station 105-*b* does not successfully decode the PUCCH transmitted by the UE 115-*b*, the base station may transmit a HARQ negative ACK (HARQ-NACK) message to the UE 115-*b* indicating that decoding was unsuccessful, and the UE 115-*b* may perform retransmission of the PUCCH.

Figure 7:
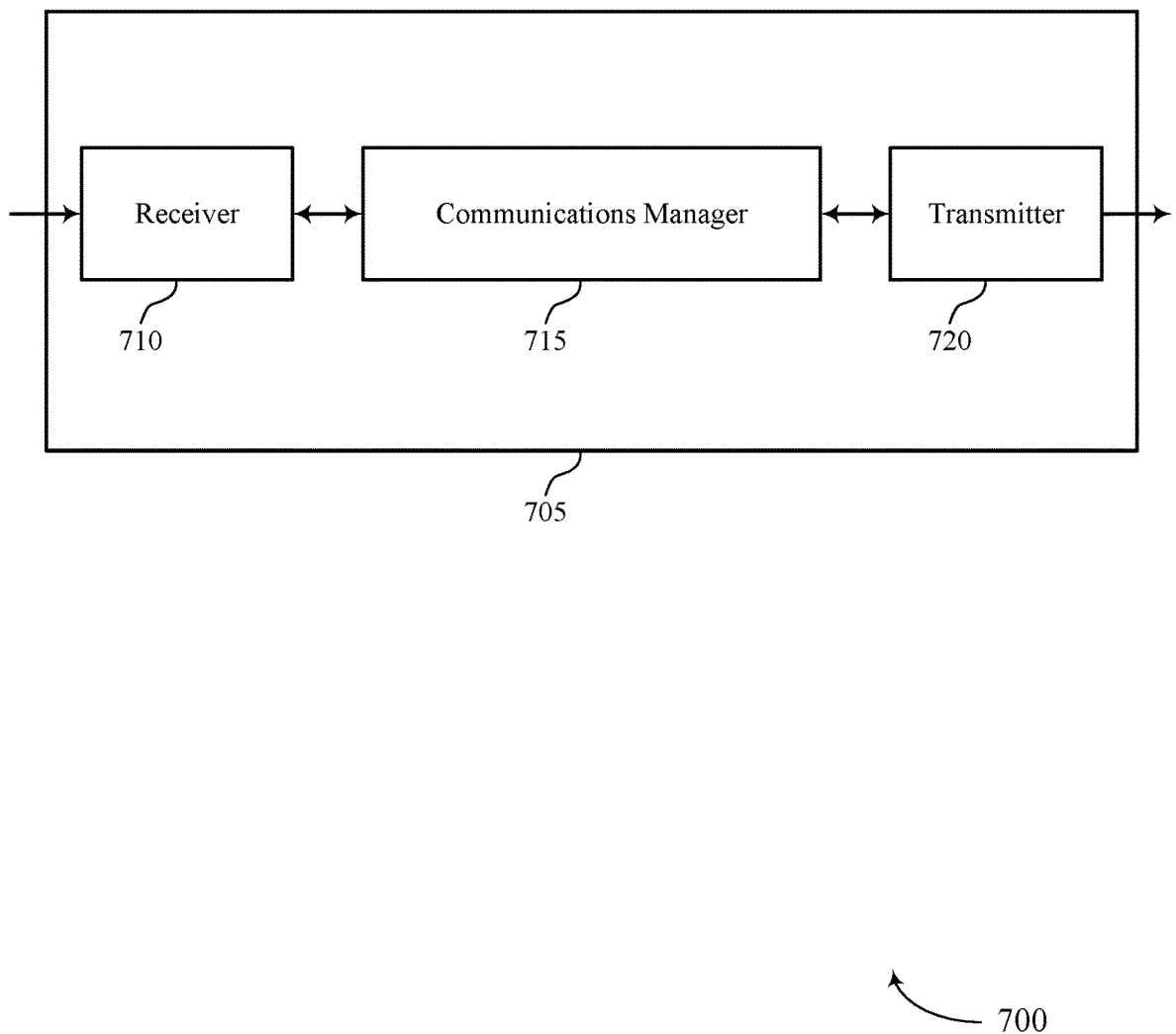
FIGS. 7 and 8 show block diagrams of devices that support transmission diversity enhancement for uplink control channel in accordance with aspects of the present disclosure.

FIG. 7 shows a block diagram 700 of a device 705 that supports transmission diversity enhancement for uplink control channel in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to transmission diversity enhancement for uplink control channel, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a resolution level and a diversity level for an uplink control channel, precode information for transmission via the uplink control channel based on the resolution level and the diversity level, and transmit, via the uplink control channel, an OFDM waveform generated based on the precoded information. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
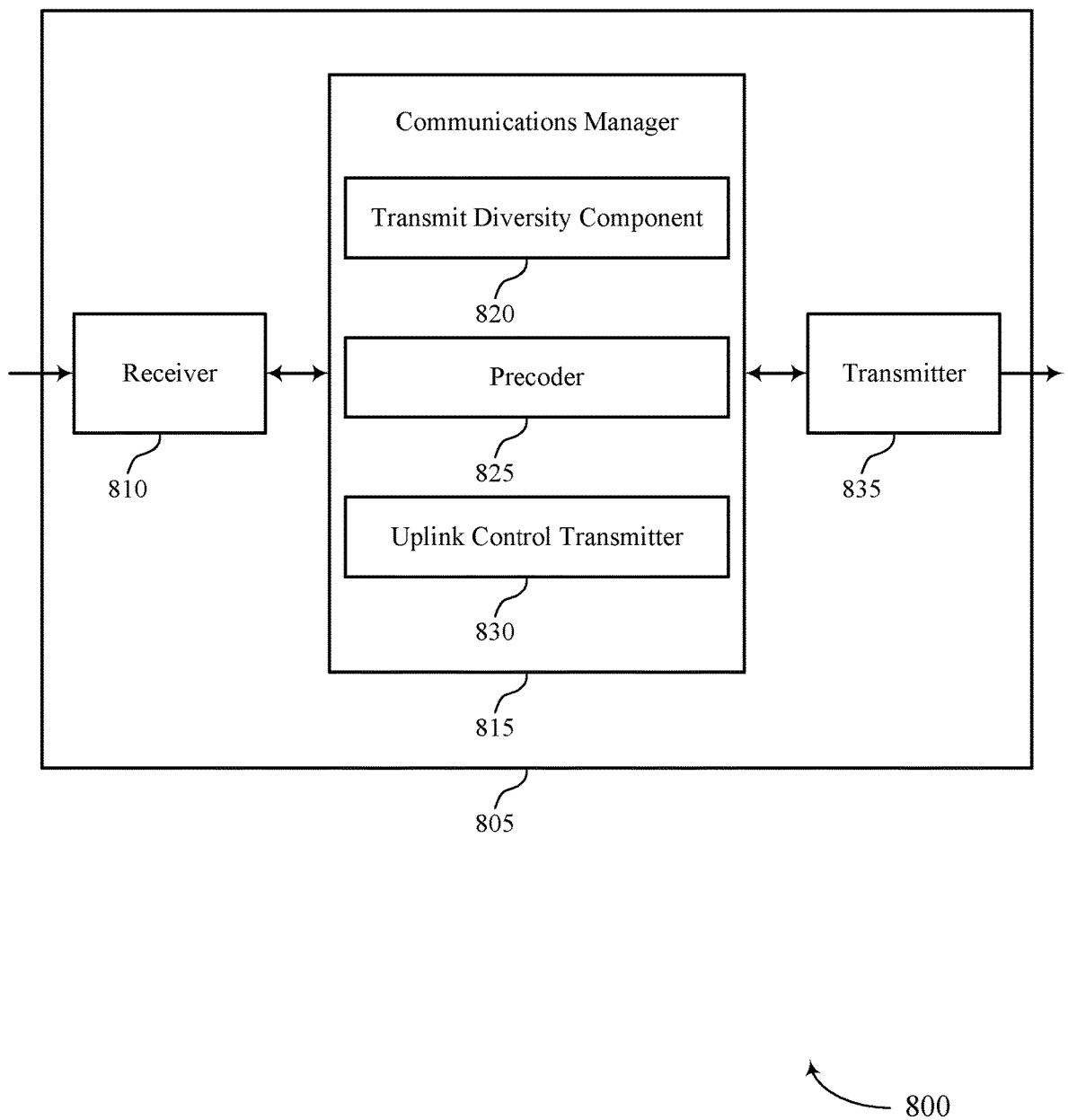

FIG. 8 shows a block diagram 800 of a device 805 that supports transmission diversity enhancement for uplink control channel in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to transmission diversity enhancement for uplink control channel, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a transmit diversity component 820, a precoder 825, and an uplink control transmitter 830. The communications manager 815 may be an example of aspects of the communications manager 1010 described herein.

The transmit diversity component 820 may identify a resolution level and a diversity level for an uplink control channel.

The precoder 825 may precode information for transmission via the uplink control channel based on the resolution level and the diversity level.

The uplink control transmitter 830 may transmit, via the uplink control channel, an OFDM waveform generated based on the precoded information.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

In some examples, communications manager 815 may be implemented as an integrated circuit or chipset for a mobile device modem, and the receiver 810 and transmitter 820 may be implemented as analog components (e.g., amplifiers, filters, antennas, etc.) coupled with the mobile device modem to enable wireless transmission and reception.

The communications manager 815 as described herein may be implemented to realize one or more potential advantages. At least one implementation may enable the communications manager 815 to effectively enhance a spatial transmission scheme associated with at least one PUCCH format. In some cases, the techniques described herein may allow the communications manager 815 to increase transmit diversity (e.g., frequency and time domain transmission diversity) by using different spatial precoding between resources.

Based on implementing the basis subset feedback techniques as described herein, one or more processors of the device 805 (e.g., processor(s) controlling or incorporated with one or more of receiver 810, communications manager 815, and transmitter 820) may increase transmit diversity for identified channel resources, enhance channel estimation at a device, and reduce communications latency.

Figure 9:
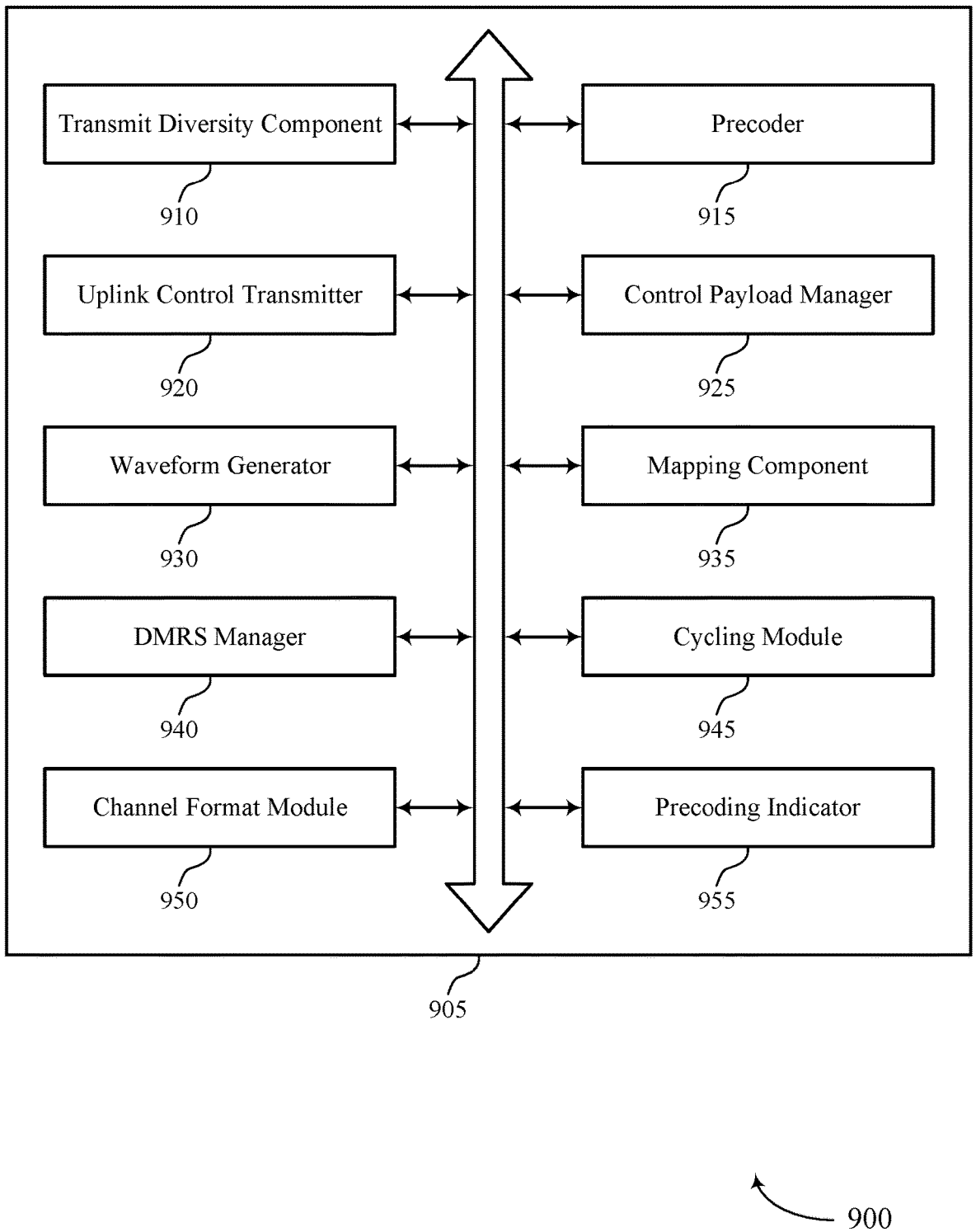
FIG. 9 shows a block diagram of a communications manager that supports transmission diversity enhancement for uplink control channel in accordance with aspects of the present disclosure.

FIG. 9 shows a block diagram 900 of a communications manager 905 that supports transmission diversity enhancement for uplink control channel in accordance with aspects of the present disclosure. The communications manager 905 may be an example of aspects of a communications manager 715, a communications manager 815, or a communications manager 1010 described herein. The communications manager 905 may include a transmit diversity component 910, a precoder 915, an uplink control transmitter 920, a control payload manager 925, a waveform generator 930, a mapping component 935, a DMRS manager 940, a cycling module 945, a channel format module 950, and a precoding indicator 955. Each of these modules may communicate, directly or indirectly, with one another (e.g., via one or more buses).

The transmit diversity component 910 may identify a resolution level and a diversity level for an uplink control channel. In some examples, the transmit diversity component 910 may receive an indication of the resolution level and the diversity level. In some cases, the indication is received via a RRC message, DCI, or a PDCCH. In some instances, the uplink control channel is a PUCCH.

The precoder 915 may precode information for transmission via the uplink control channel based on the resolution level and the diversity level. In some examples, the precoder 915 may apply a different spatial precoder to a respective subset of the information that is mapped to a respective control channel payload resource element group of the set of control channel payload resource element groups. In some cases, the precoder 915 may precode a first subset of the information that is mapped to a first control channel payload resource element group of a set of control channel payload resource element groups within a resource block using a first spatial precoder of a set of spatial precoders. In some aspects, the precoder 915 may precode a second subset of the information that is mapped to a second control channel payload resource element group of the set of control channel payload resource element groups using a second spatial precoder of the set of spatial precoders that differs from the first spatial precoder. In some instances, the precoder 915 may determine a precoding pattern for a set of demodulation reference signals within each control channel payload resource element group of a set of control channel payload resource element groups based on the resolution level.

The uplink control transmitter 920 may transmit, via the uplink control channel, an OFDM waveform generated based on the precoded information. In some examples, the uplink control transmitter 920 may transmit the OFDM waveform in a single transmission time interval or two transmission time intervals.

The control payload manager 925 may identify a set of control channel payload resource element groups within a resource block based on the resolution level and the diversity level. In some examples, the control payload manager 925 may identify, based on the diversity level, a number of the set of control channel payload resource element groups within the resource block.

The waveform generator 930 may generate the OFDM waveform based on the number. In some examples, the waveform generator 930 may generate the OFDM waveform based on the mapping pattern. In some cases, the waveform generator 930 may generate the OFDM waveform based on the precoding pattern. In some aspects, the waveform generator 930 may generate the OFDM waveform for transmission over a set of transmission time intervals based on the cycling pattern. In some instances, the waveform generator 930 may generate the OFDM waveform based on the uplink control channel format.

The mapping component 935 may identify, based on the resolution level, a mapping pattern that indicates that resource elements of different groups of the set of control channel payload resource element groups are interleaved within the resource block. In some examples, the mapping component 935 may identify, based on the resolution level, a mapping pattern that indicates that resource elements of different groups of the set of control channel payload resource element groups are mapped to distinct sets of contiguous resource elements within the resource block. In some cases, the mapping component 935 may identify, based on the number of demodulation reference signal ports, a mapping pattern that maps at least one demodulation reference signal to at least one resource element within each control channel payload resource element group of a set of control channel payload resource element groups within a resource block.

The DMRS manager 940 may identify a number of demodulation reference signal ports based on the diversity level.

The cycling module 945 may identify a cycling pattern for the uplink control channel. In some examples, the cycling module 945 may receive an indication of the cycling pattern. In some cases, the cycling module 945 may cycle, based on the cycling pattern, which spatial precoder of a set of different spatial precoders is mapped to a respective control channel payload resource element group of a set of control channel payload resource element groups in each transmission time interval of the set of transmission time intervals. In some aspects, the cycling pattern is a time domain cycling pattern, a frequency domain cycling pattern, or a time and frequency domain cycling pattern.

The channel format module 950 may identify an uplink control channel format for the uplink control channel. In some examples, the channel format module 950 may receive an indication of the uplink control channel format.

The precoding indicator 955 may transmit an indication of a set of spatial precoders applied for precoding the information.

Figure 10:
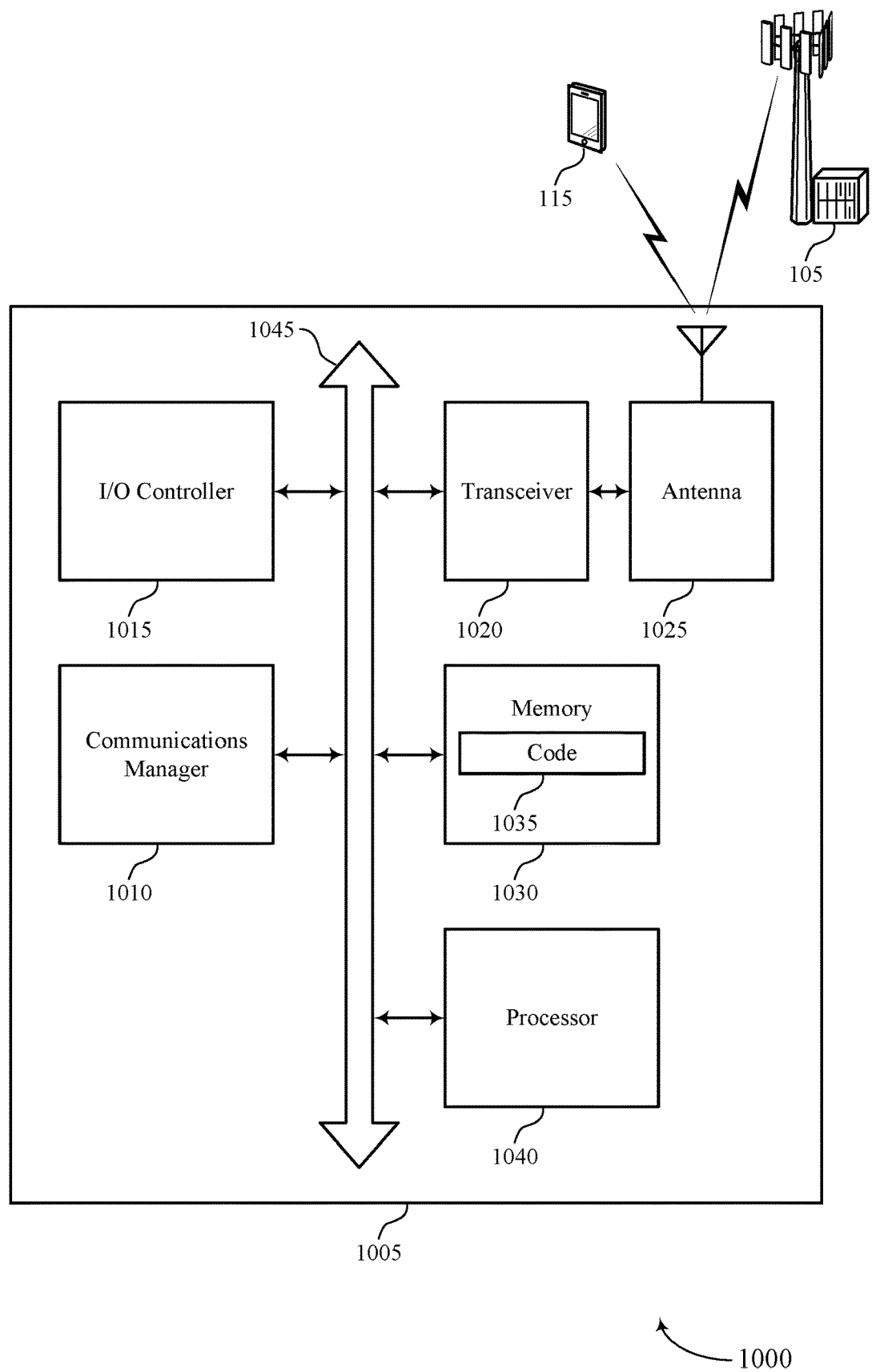
FIG. 10 shows a diagram of a system including a device that supports transmission diversity enhancement for uplink control channel in accordance with aspects of the present disclosure.

FIG. 10 shows a diagram of a system 1000 including a device 1005 that supports transmission diversity enhancement for uplink control channel in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a resolution level and a diversity level for an uplink control channel, precode information for transmission via the uplink control channel based on the resolution level and the diversity level, and transmit, via the uplink control channel, an OFDM waveform generated based on the precoded information.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the device 1005 may include a single antenna 1025, or the device 1005 may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting transmission diversity enhancement for uplink control channel).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
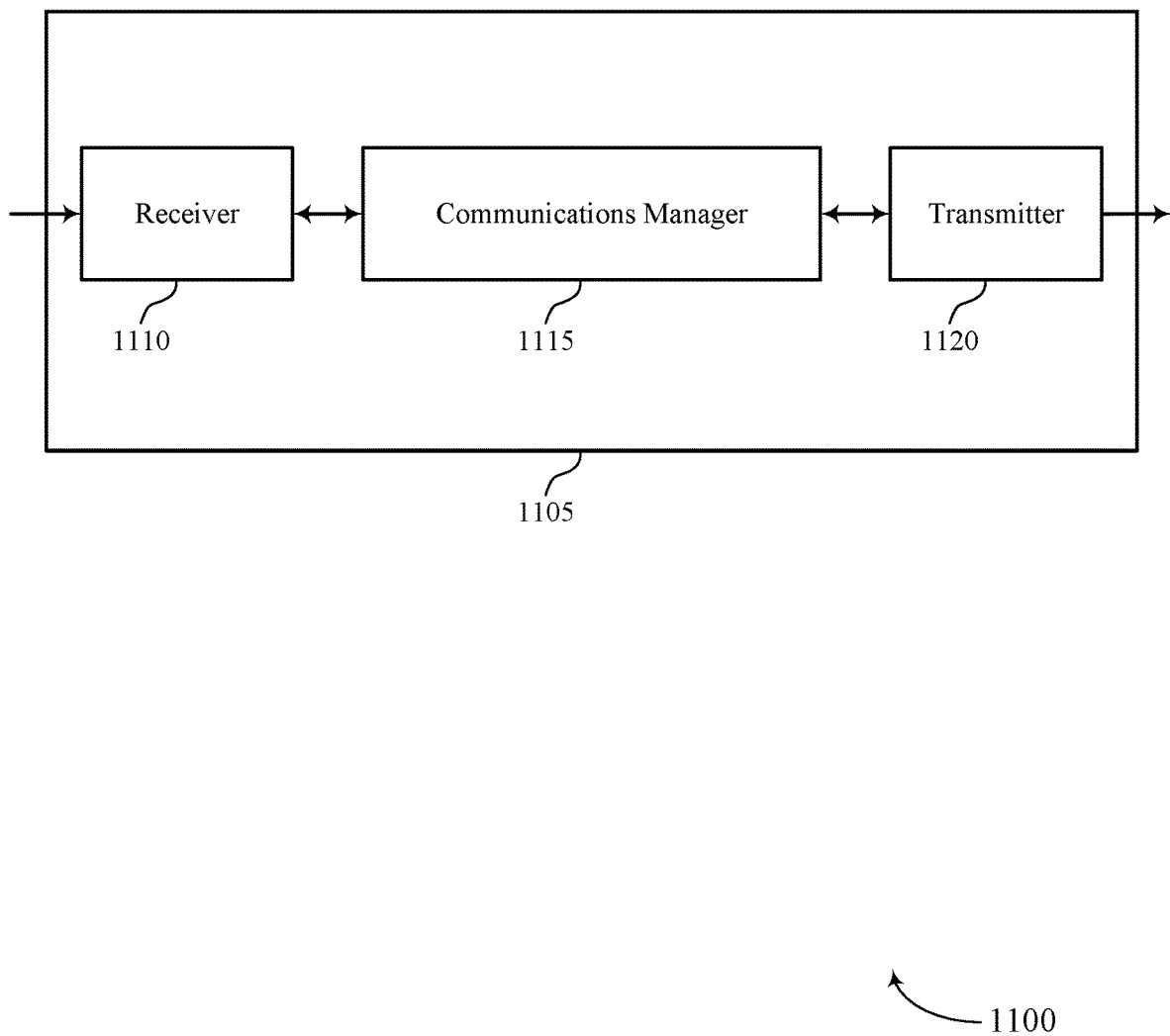
FIGS. 11 and 12 show block diagrams of devices that support transmission diversity enhancement for uplink control channel in accordance with aspects of the present disclosure.

FIG. 11 shows a block diagram 1100 of a device 1105 that supports transmission diversity enhancement for uplink control channel in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to transmission diversity enhancement for uplink control channel, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a resolution level and a diversity level for an uplink control channel and monitor the uplink control channel for an OFDM waveform generated based on information precoded according to the resolution level and the diversity level. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
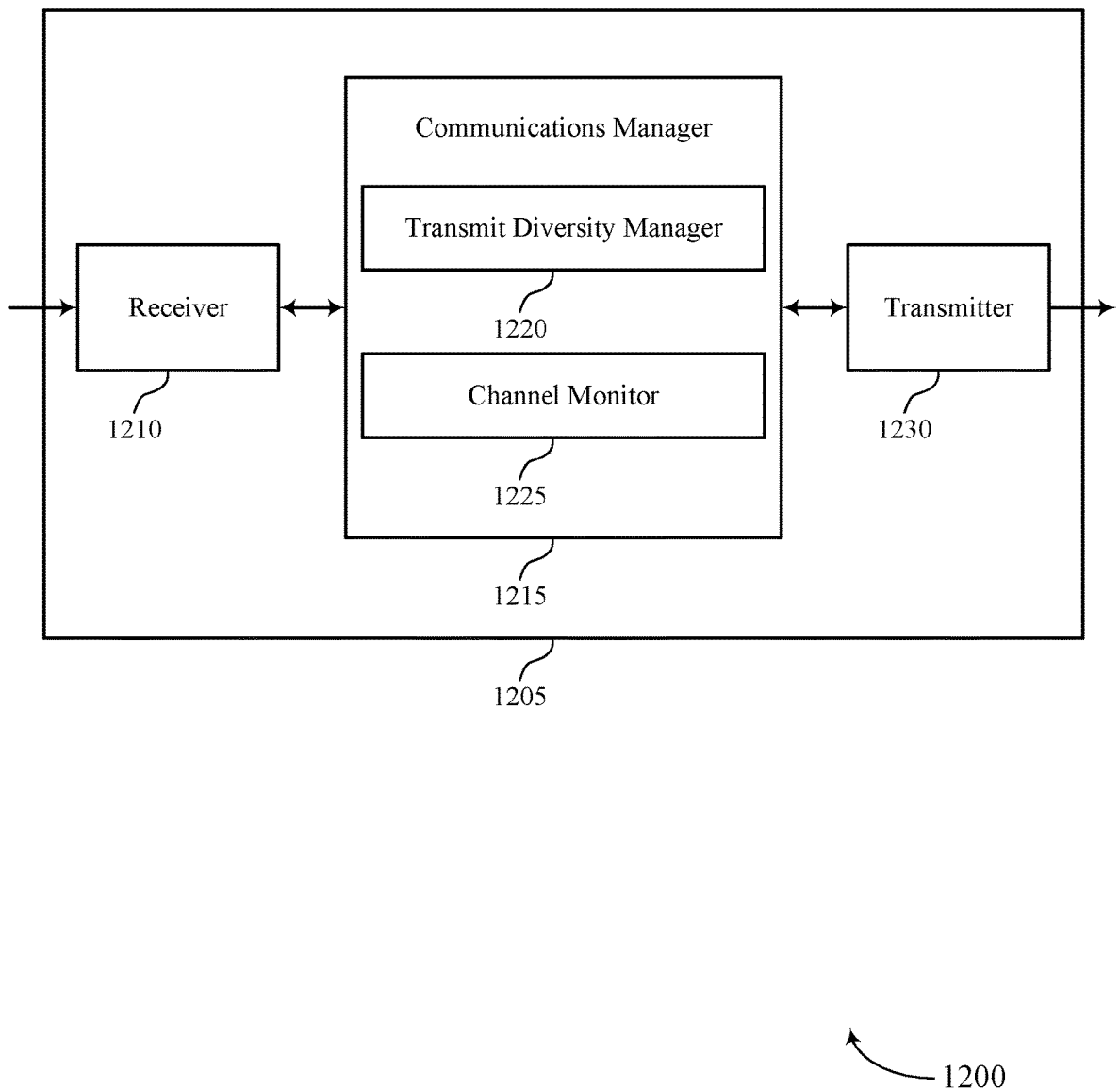

FIG. 12 shows a block diagram 1200 of a device 1205 that supports transmission diversity enhancement for uplink control channel in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to transmission diversity enhancement for uplink control channel, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a transmit diversity manager 1220 and a channel monitor 1225. The communications manager 1215 may be an example of aspects of the communications manager 1410 described herein.

The transmit diversity manager 1220 may identify a resolution level and a diversity level for an uplink control channel.

The channel monitor 1225 may monitor the uplink control channel for an OFDM waveform generated based on information precoded according to the resolution level and the diversity level.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
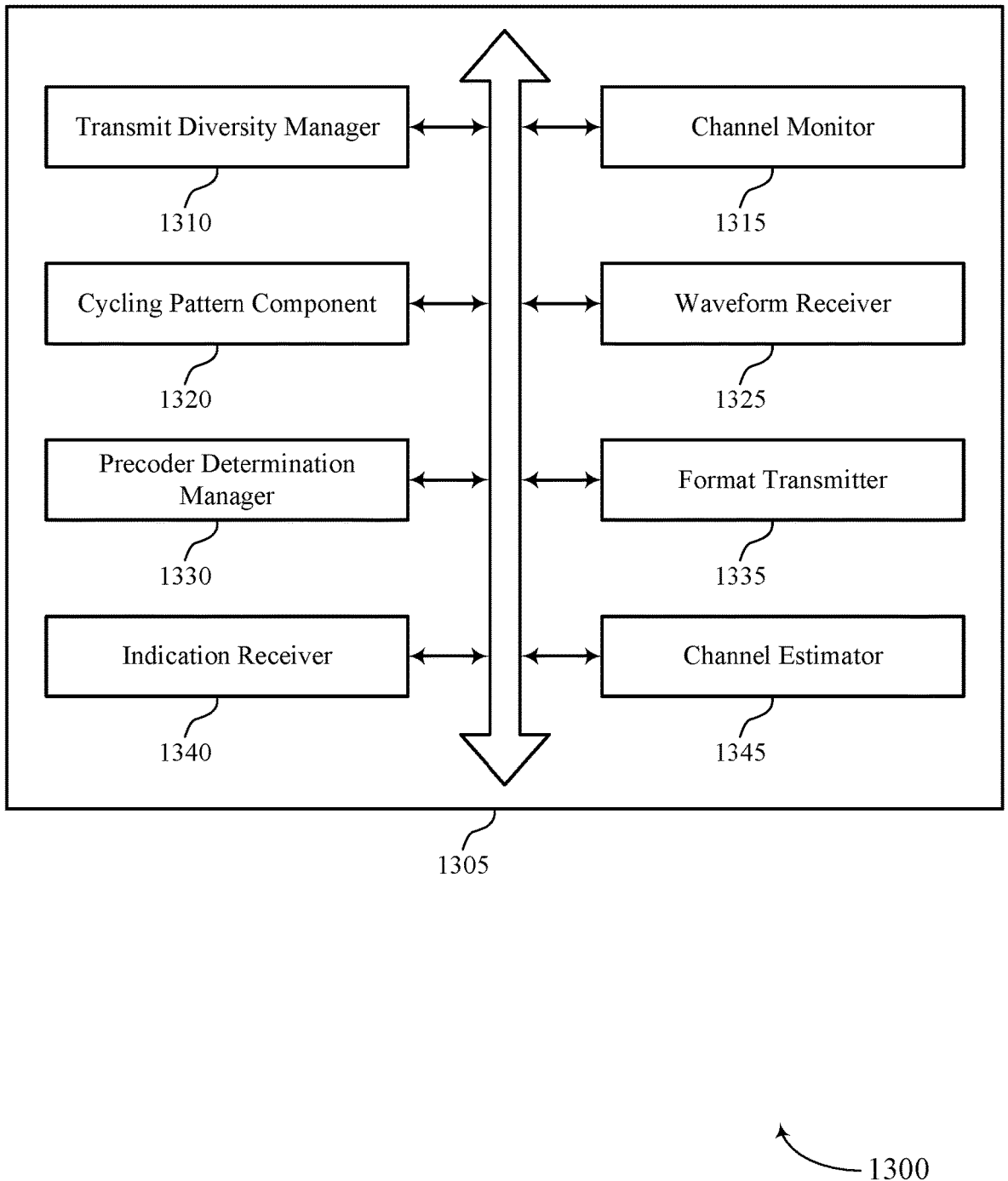
FIG. 13 shows a block diagram of a communications manager that supports transmission diversity enhancement for uplink control channel in accordance with aspects of the present disclosure.

FIG. 13 shows a block diagram 1300 of a communications manager 1305 that supports transmission diversity enhancement for uplink control channel in accordance with aspects of the present disclosure. The communications manager 1305 may be an example of aspects of a communications manager 1115, a communications manager 1215, or a communications manager 1410 described herein. The communications manager 1305 may include a transmit diversity manager 1310, a channel monitor 1315, a cycling pattern component 1320, a waveform receiver 1325, a precoder determination manager 1330, a format transmitter 1335, an indication receiver 1340, and a channel estimator 1345. Each of these modules may communicate, directly or indirectly, with one another (e.g., via one or more buses).

The transmit diversity manager 1310 may identify a resolution level and a diversity level for an uplink control channel. In some examples, the transmit diversity manager 1310 may transmit an indication of the resolution level and the diversity level. In some cases, the indication is transmitted via a RRC message, DCI, or a PDCCH. In some aspects, the uplink control channel includes a PUCCH.

The channel monitor 1315 may monitor the uplink control channel for an OFDM waveform generated based on information precoded according to the resolution level and the diversity level. In some examples, the channel monitor 1315 may monitor a single transmission time interval or two transmission time intervals for the OFDM waveform.

The cycling pattern component 1320 may transmit an indication of a cycling pattern for the uplink control channel, where monitoring of the uplink control channel for the OFDM waveform is based on the cycling pattern. In some examples, the cycling pattern component 1320 may identify a cycling pattern for the uplink control channel. In some cases, the cycling pattern is a time domain cycling pattern, a frequency domain cycling pattern, or a time and frequency domain cycling pattern.

The waveform receiver 1325 may receive the OFDM waveform over a set of transmission time intervals based on the cycling pattern.

The precoder determination manager 1330 may determine, based on the cycling pattern, which spatial precoder of a set of different spatial precoders is mapped to a respective control channel payload resource element group of a set of control channel payload resource element groups in each transmission time interval of the set of transmission time intervals.

The format transmitter 1335 may transmit an indication of an uplink control channel format, where the monitoring of the uplink control channel for the OFDM waveform is based on the uplink control channel format.

The indication receiver 1340 may receive an indication of a set of spatial precoders applied for precoding the information.

The channel estimator 1345 may generate a channel estimate for the uplink control channel based on the indication of the set of spatial precoders.

Figure 14:
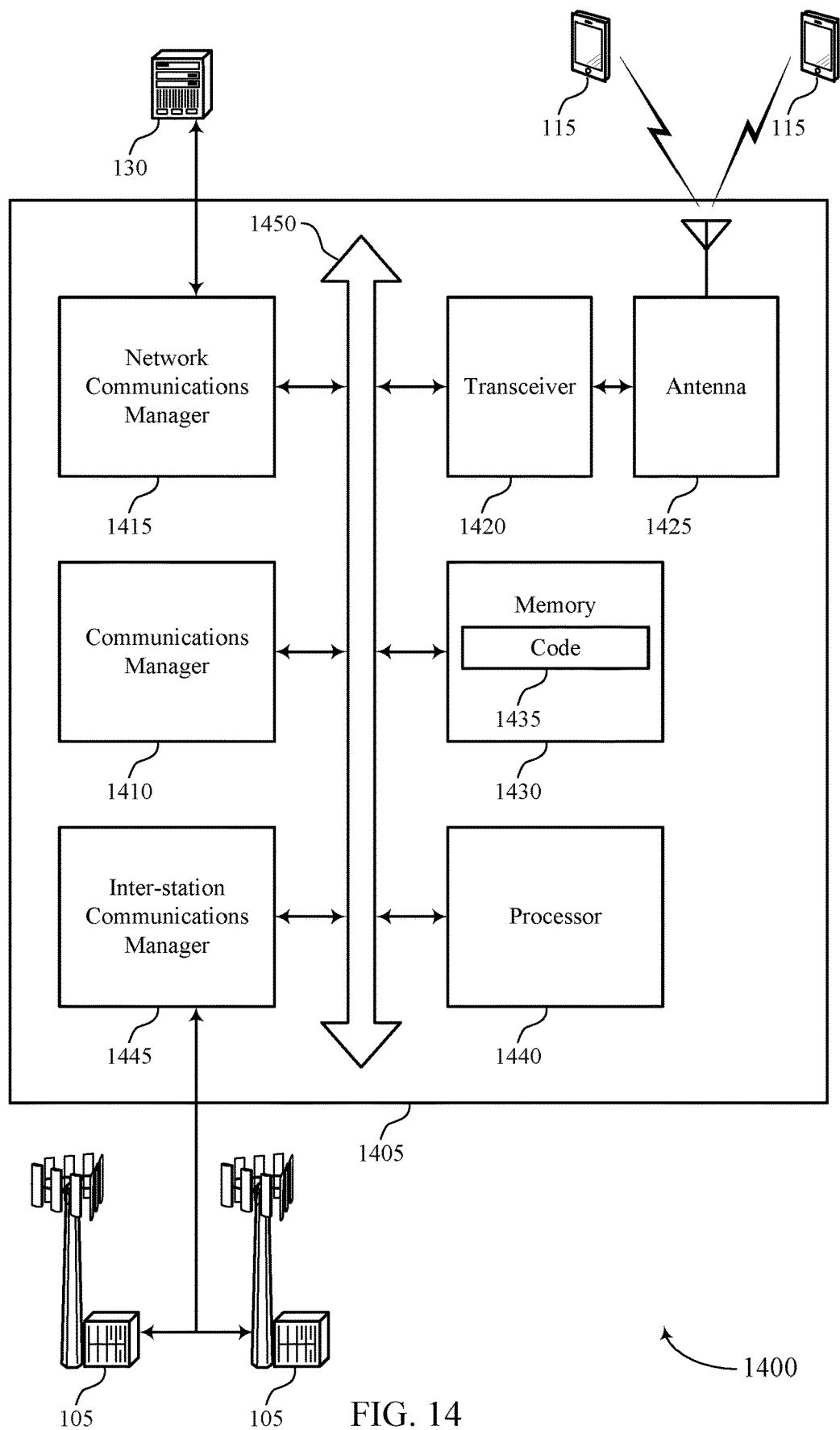
FIG. 14 shows a diagram of a system including a device that supports transmission diversity enhancement for uplink control channel in accordance with aspects of the present disclosure.

FIG. 14 shows a diagram of a system 1400 including a device 1405 that supports transmission diversity enhancement for uplink control channel in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a resolution level and a diversity level for an uplink control channel and monitor the uplink control channel for an OFDM waveform generated based on information precoded according to the resolution level and the diversity level.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the device 1405 may include a single antenna 1425, or the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting transmission diversity enhancement for uplink control channel).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
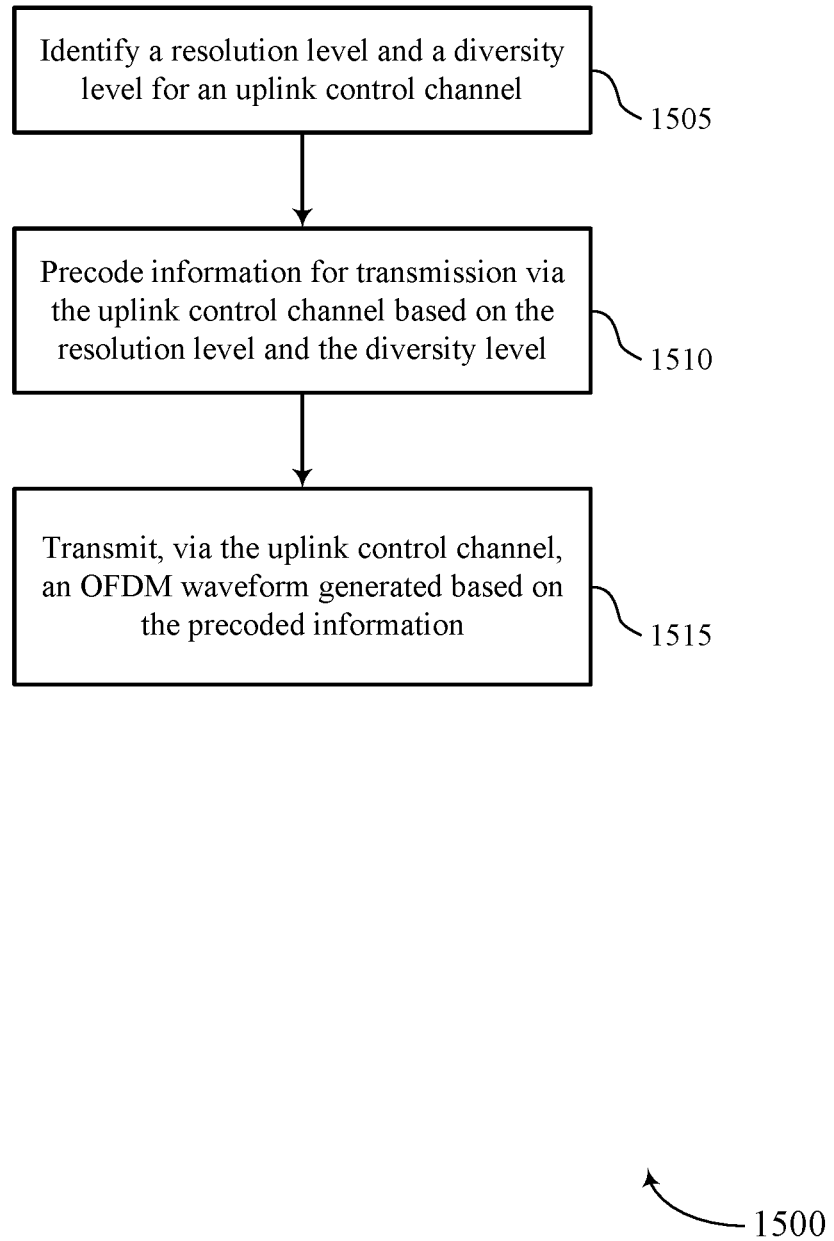
FIGS. 15 through 23 show flowcharts illustrating methods that support transmission diversity enhancement for uplink control channel in accordance with aspects of the present disclosure.

FIG. 15 shows a flowchart illustrating a method 1500 that supports transmission diversity enhancement for uplink control channel in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may identify a resolution level and a diversity level for an uplink control channel. The operations of 1505 may be performed according to the methods described herein. In some examples, aspects of the operations of 1505 may be performed by a transmit diversity component as described with reference to FIGS. 7 through 10.

At 1510, the UE may precode information for transmission via the uplink control channel based on the resolution level and the diversity level. The operations of 1510 may be performed according to the methods described herein. In some examples, aspects of the operations of 1510 may be performed by a precoder as described with reference to FIGS. 7 through 10.

At 1515, the UE may transmit, via the uplink control channel, an OFDM waveform generated based on the precoded information. The operations of 1515 may be performed according to the methods described herein. In some examples, aspects of the operations of 1515 may be performed by an uplink control transmitter as described with reference to FIGS. 7 through 10.

Figure 16:
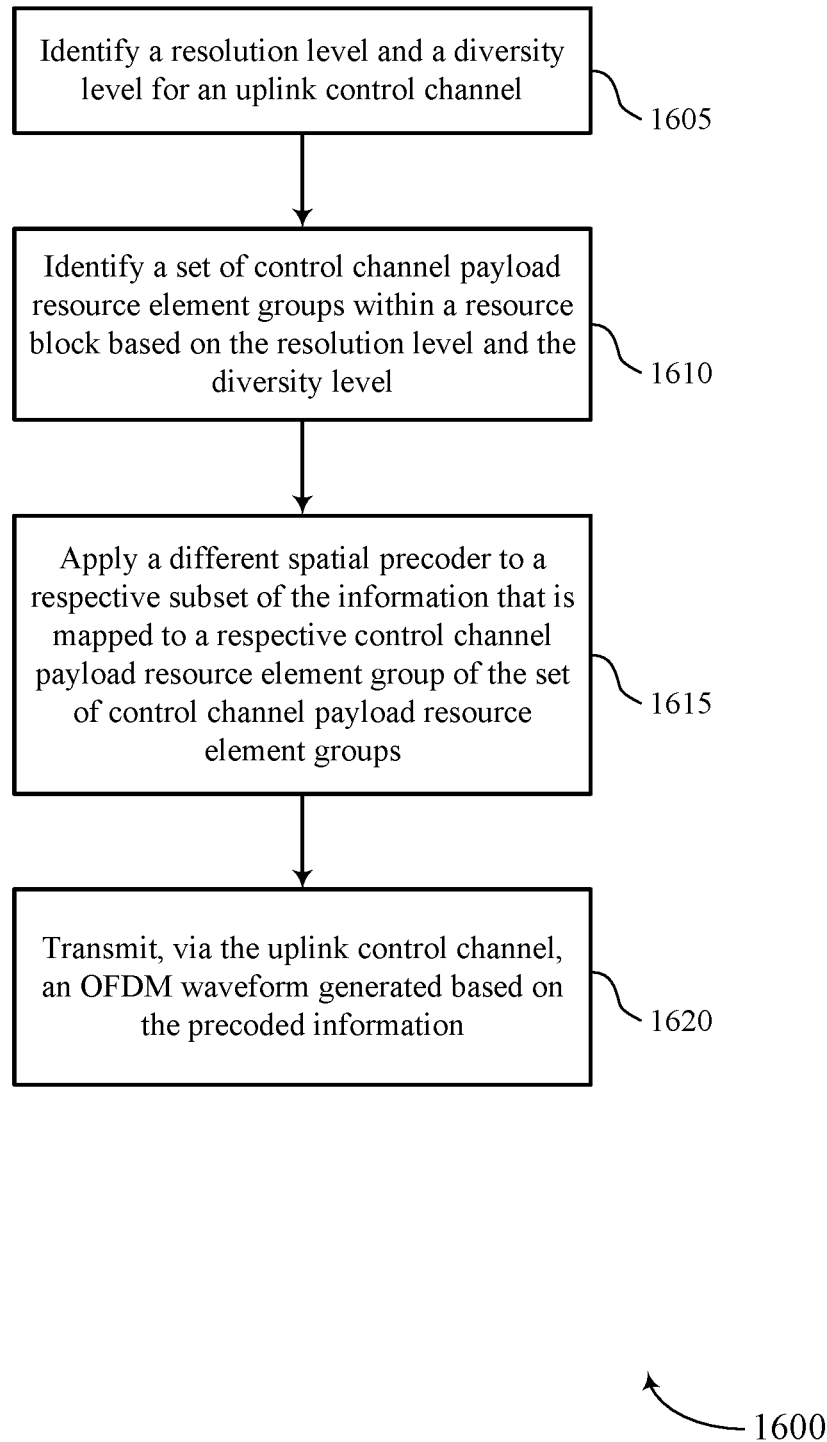

FIG. 16 shows a flowchart illustrating a method 1600 that supports transmission diversity enhancement for uplink control channel in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may identify a resolution level and a diversity level for an uplink control channel. The operations of 1605 may be performed according to the methods described herein. In some examples, aspects of the operations of 1605 may be performed by a transmit diversity component as described with reference to FIGS. 7 through 10.

At 1610, the UE may identify a set of control channel payload resource element groups within a resource block based on the resolution level and the diversity level. The operations of 1610 may be performed according to the methods described herein. In some examples, aspects of the operations of 1610 may be performed by a control payload manager as described with reference to FIGS. 7 through 10.

At 1615, the UE may apply a different spatial precoder to a respective subset of the information that is mapped to a respective control channel payload resource element group of the set of control channel payload resource element groups. The operations of 1615 may be performed according to the methods described herein. In some examples, aspects of the operations of 1615 may be performed by a precoder as described with reference to FIGS. 7 through 10.

At 1620, the UE may transmit, via the uplink control channel, an OFDM waveform generated based on the precoded information. The operations of 1620 may be performed according to the methods described herein. In some examples, aspects of the operations of 1620 may be performed by an uplink control transmitter as described with reference to FIGS. 7 through 10.

Figure 17:
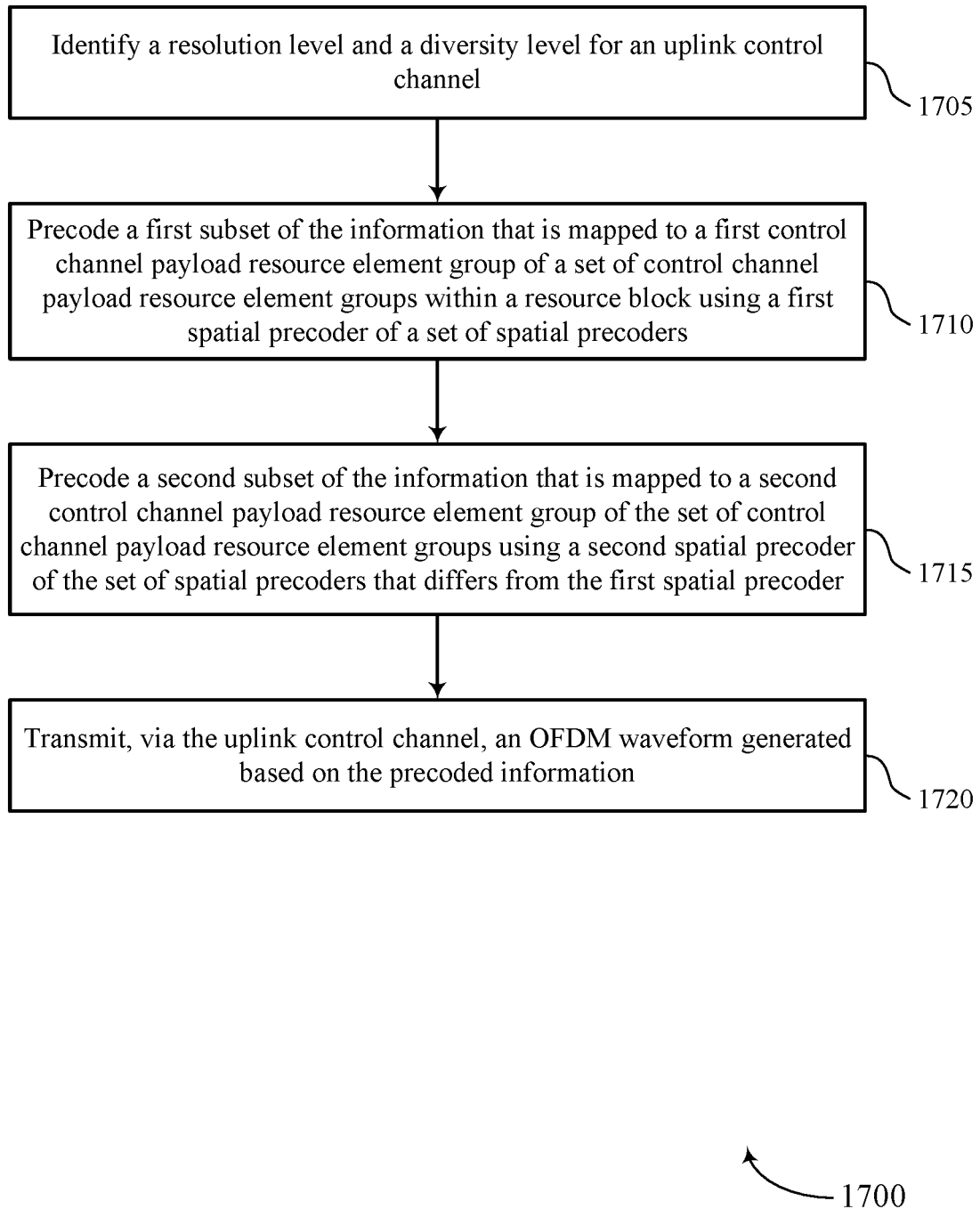

FIG. 17 shows a flowchart illustrating a method 1700 that supports transmission diversity enhancement for uplink control channel in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may identify a resolution level and a diversity level for an uplink control channel. The operations of 1705 may be performed according to the methods described herein. In some examples, aspects of the operations of 1705 may be performed by a transmit diversity component as described with reference to FIGS. 7 through 10.

At 1710, the UE may precode a first subset of the information that is mapped to a first control channel payload resource element group of a set of control channel payload resource element groups within a resource block using a first spatial precoder of a set of spatial precoders. The operations of 1710 may be performed according to the methods described herein. In some examples, aspects of the operations of 1710 may be performed by a precoder as described with reference to FIGS. 7 through 10.

At 1715, the UE may precode a second subset of the information that is mapped to a second control channel payload resource element group of the set of control channel payload resource element groups using a second spatial precoder of the set of spatial precoders that differs from the first spatial precoder. The operations of 1715 may be performed according to the methods described herein. In some examples, aspects of the operations of 1715 may be performed by a precoder as described with reference to FIGS. 7 through 10.

At 1720, the UE may transmit, via the uplink control channel, an OFDM waveform generated based on the precoded information. The operations of 1720 may be performed according to the methods described herein. In some examples, aspects of the operations of 1720 may be performed by an uplink control transmitter as described with reference to FIGS. 7 through 10.

Figure 18:
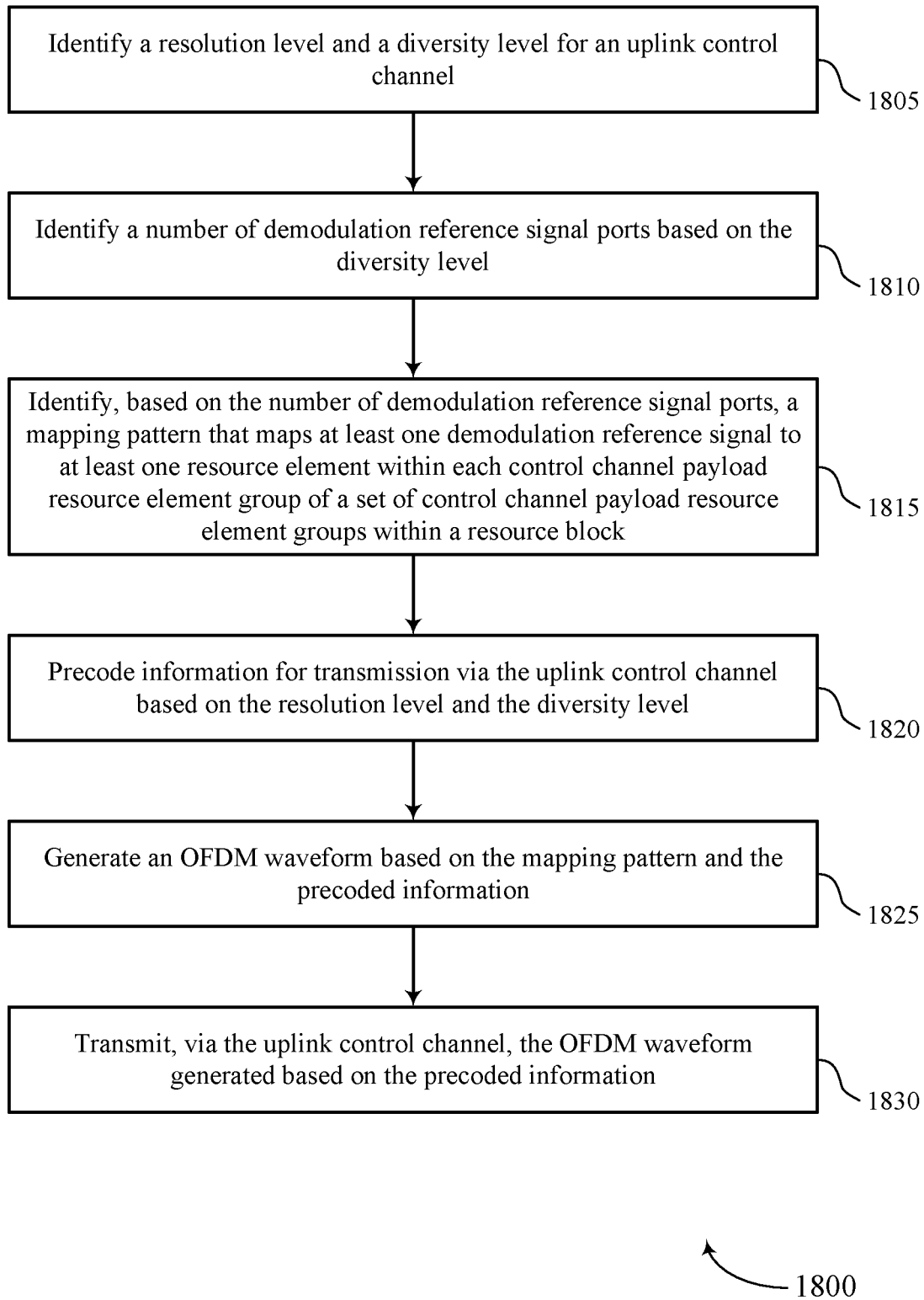

FIG. 18 shows a flowchart illustrating a method 1800 that supports transmission diversity enhancement for uplink control channel in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may identify a resolution level and a diversity level for an uplink control channel. The operations of 1805 may be performed according to the methods described herein. In some examples, aspects of the operations of 1805 may be performed by a transmit diversity component as described with reference to FIGS. 7 through 10.

At 1810, the UE may identify a number of demodulation reference signal ports based on the diversity level. The operations of 1810 may be performed according to the methods described herein. In some examples, aspects of the operations of 1810 may be performed by a DMRS manager as described with reference to FIGS. 7 through 10.

At 1815, the UE may identify, based on the number of demodulation reference signal ports, a mapping pattern that maps at least one demodulation reference signal to at least one resource element within each control channel payload resource element group of a set of control channel payload resource element groups within a resource block. The operations of 1815 may be performed according to the methods described herein. In some examples, aspects of the operations of 1815 may be performed by a mapping component as described with reference to FIGS. 7 through 10.

At 1820, the UE may precode information for transmission via the uplink control channel based on the resolution level and the diversity level. The operations of 1820 may be performed according to the methods described herein. In some examples, aspects of the operations of 1820 may be performed by a precoder as described with reference to FIGS. 7 through 10.

At 1825, the UE may generate an OFDM waveform based on the mapping pattern and the precoded information. The operations of 1825 may be performed according to the methods described herein. In some examples, aspects of the operations of 1825 may be performed by a waveform generator as described with reference to FIGS. 7 through 10.

At 1830, the UE may transmit, via an OFDM waveform based on the mapping pattern and the precoded information. The operations of 1830 may be performed according to the methods described herein. In some examples, aspects of the operations of 1830 may be performed by an uplink control transmitter as described with reference to FIGS. 7 through 10.

Figure 19:
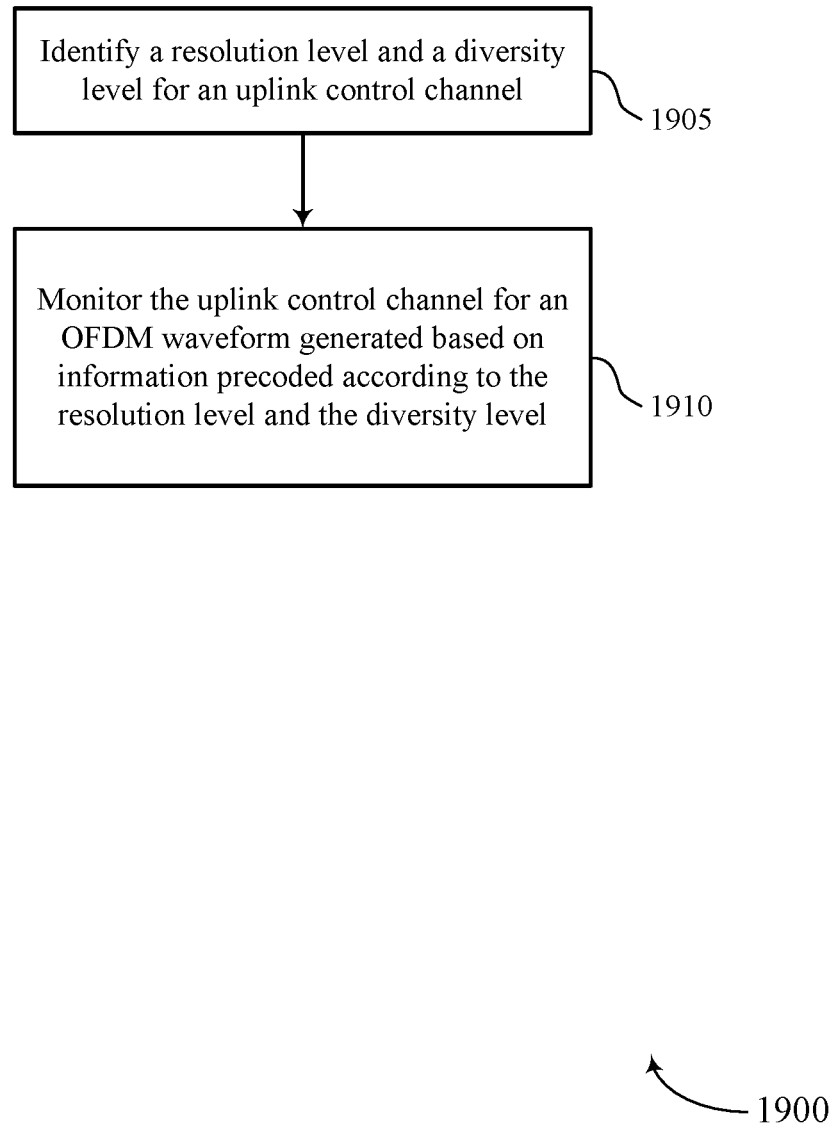

FIG. 19 shows a flowchart illustrating a method 1900 that supports transmission diversity enhancement for uplink control channel in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may identify a resolution level and a diversity level for an uplink control channel. The operations of 1905 may be performed according to the methods described herein. In some examples, aspects of the operations of 1905 may be performed by a transmit diversity manager as described with reference to FIGS. 11 through 14.

At 1910, the base station may monitor the uplink control channel for an OFDM waveform generated based on information precoded according to the resolution level and the diversity level. The operations of 1910 may be performed according to the methods described herein. In some examples, aspects of the operations of 1910 may be performed by a channel monitor as described with reference to FIGS. 11 through 14.

Figure 20:
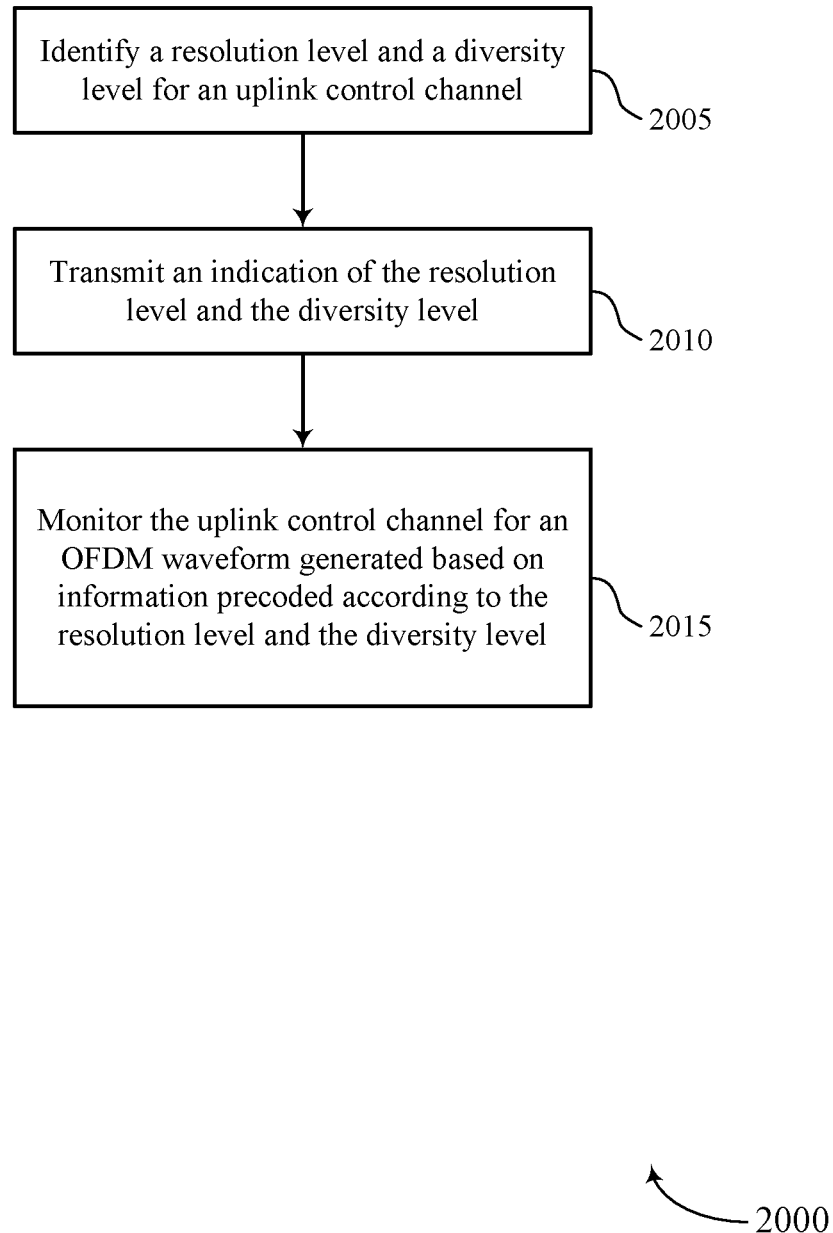

FIG. 20 shows a flowchart illustrating a method 2000 that supports transmission diversity enhancement for uplink control channel in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may identify a resolution level and a diversity level for an uplink control channel. The operations of 2005 may be performed according to the methods described herein. In some examples, aspects of the operations of 2005 may be performed by a transmit diversity manager as described with reference to FIGS. 11 through 14.

At 2010, the base station may transmit an indication of the resolution level and the diversity level. The operations of 2010 may be performed according to the methods described herein. In some examples, aspects of the operations of 2010 may be performed by a transmit diversity manager as described with reference to FIGS. 11 through 14.

At 2015, the base station may monitor the uplink control channel for an OFDM waveform generated based on information precoded according to the resolution level and the diversity level. The operations of 2015 may be performed according to the methods described herein. In some examples, aspects of the operations of 2015 may be performed by a channel monitor as described with reference to FIGS. 11 through 14.

Figure 21:
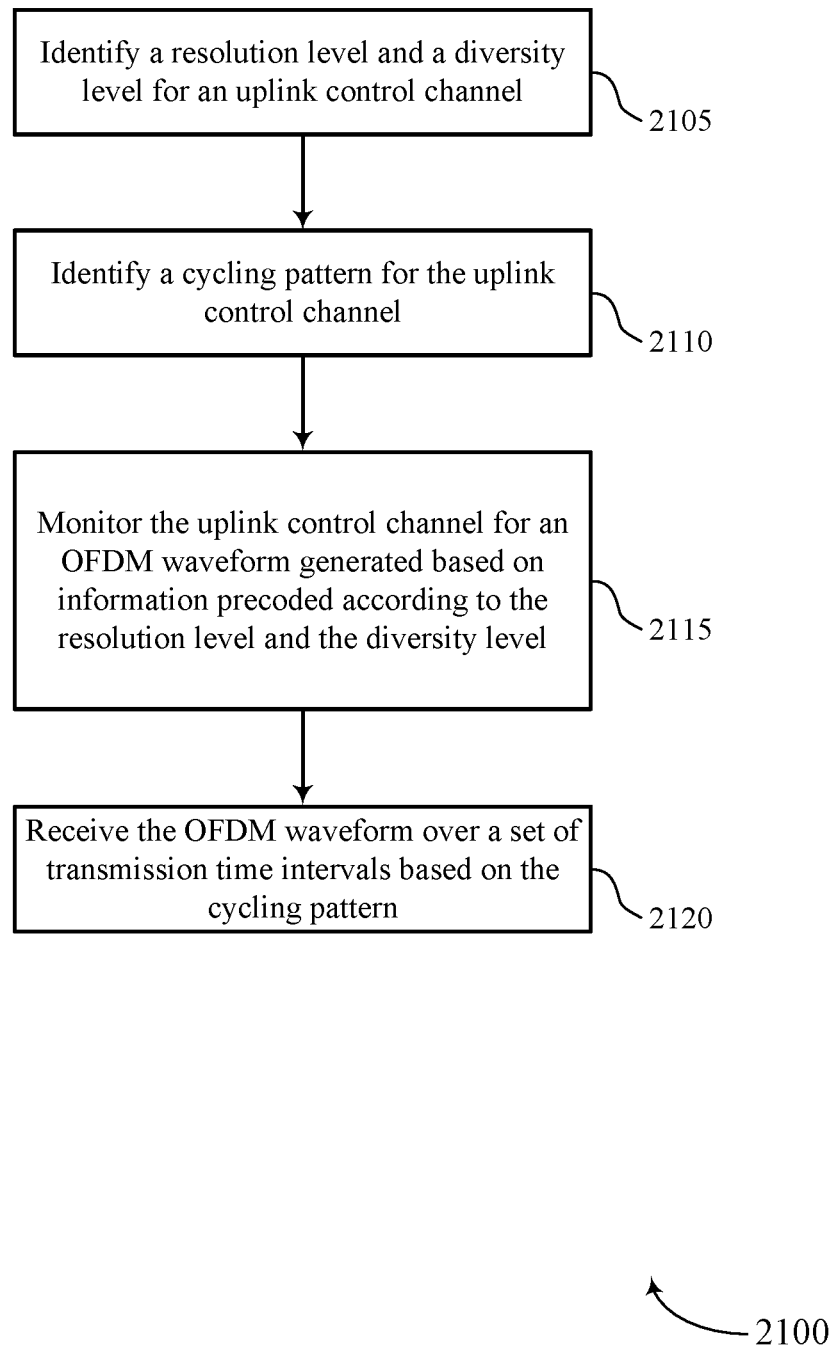

FIG. 21 shows a flowchart illustrating a method 2100 that supports transmission diversity enhancement for uplink control channel in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may identify a resolution level and a diversity level for an uplink control channel. The operations of 2105 may be performed according to the methods described herein. In some examples, aspects of the operations of 2105 may be performed by a transmit diversity manager as described with reference to FIGS. 11 through 14.

At 2110, the base station may identify a cycling pattern for the uplink control channel. The operations of 2110 may be performed according to the methods described herein. In some examples, aspects of the operations of 2110 may be performed by a cycling pattern component as described with reference to FIGS. 11 through 14.

At 2115, the base station may monitor the uplink control channel for an OFDM waveform generated based on information precoded according to the resolution level and the diversity level. The operations of 2115 may be performed according to the methods described herein. In some examples, aspects of the operations of 2115 may be performed by a channel monitor as described with reference to FIGS. 11 through 14.

At 2120, the base station may receive the OFDM waveform over a set of transmission time intervals based on the cycling pattern. The operations of 2120 may be performed according to the methods described herein. In some examples, aspects of the operations of 2120 may be performed by a waveform receiver as described with reference to FIGS. 11 through 14.

Figure 22:
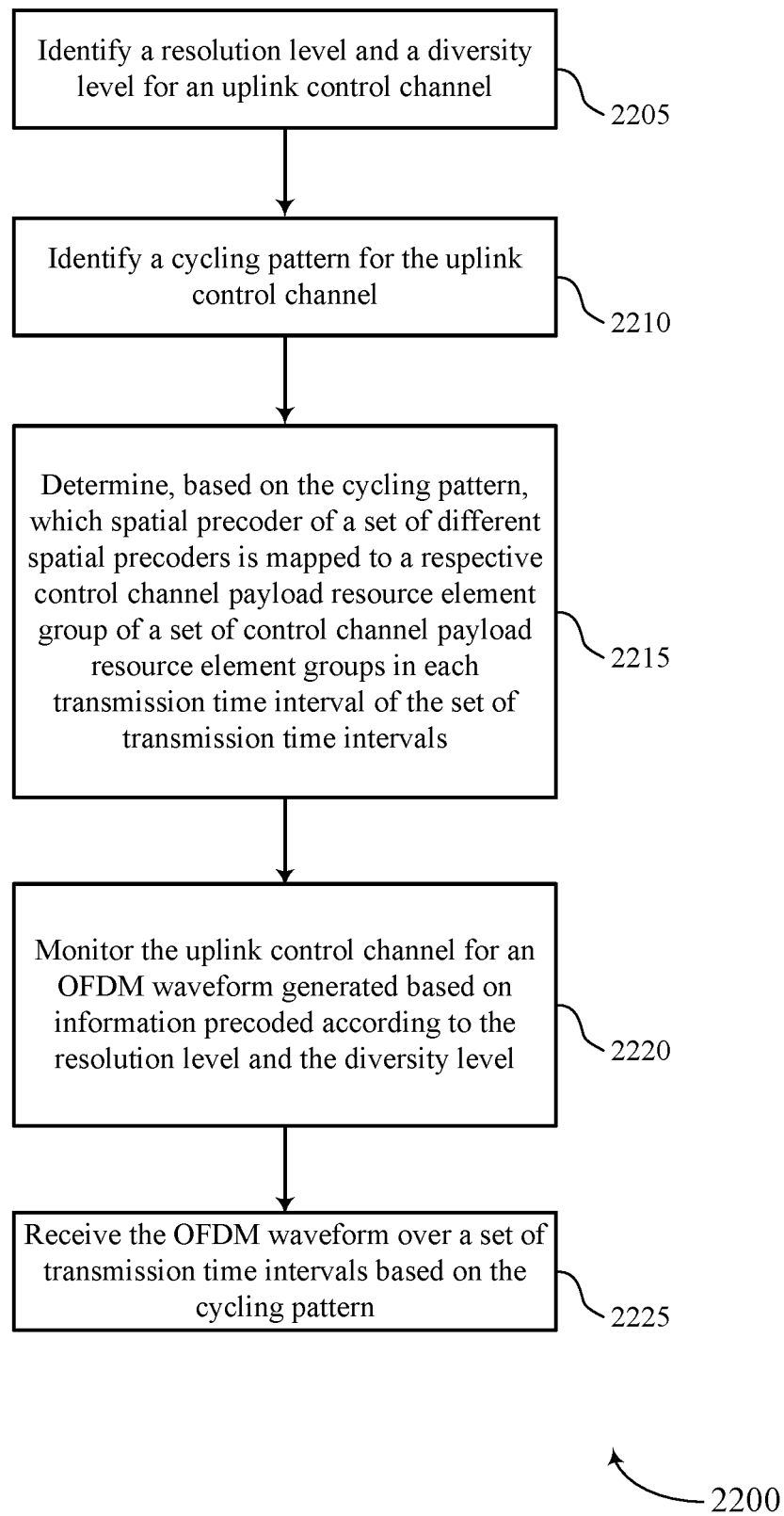

FIG. 22 shows a flowchart illustrating a method 2200 that supports transmission diversity enhancement for uplink control channel in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2205, the base station may identify a resolution level and a diversity level for an uplink control channel. The operations of 2205 may be performed according to the methods described herein. In some examples, aspects of the operations of 2205 may be performed by a transmit diversity manager as described with reference to FIGS. 11 through 14.

At 2210, the base station may identify a cycling pattern for the uplink control channel. The operations of 2210 may be performed according to the methods described herein. In some examples, aspects of the operations of 2210 may be performed by a cycling pattern component as described with reference to FIGS. 11 through 14.

At 2215, the base station may determine, based on the cycling pattern, which spatial precoder of a set of different spatial precoders is mapped to a respective control channel payload resource element group of a set of control channel payload resource element groups in each transmission time interval of the set of transmission time intervals. The operations of 2215 may be performed according to the methods described herein. In some examples, aspects of the operations of 2215 may be performed by a precoder determination manager as described with reference to FIGS. 11 through 14.

At 2220, the base station may monitor the uplink control channel for an OFDM waveform generated based on information precoded according to the resolution level and the diversity level. The operations of 2220 may be performed according to the methods described herein. In some examples, aspects of the operations of 2220 may be performed by a channel monitor as described with reference to FIGS. 11 through 14.

At 2225, the base station may receive the OFDM waveform over a set of transmission time intervals based on the cycling pattern. The operations of 2225 may be performed according to the methods described herein. In some examples, aspects of the operations of 2225 may be performed by a waveform receiver as described with reference to FIGS. 11 through 14.

Figure 23:
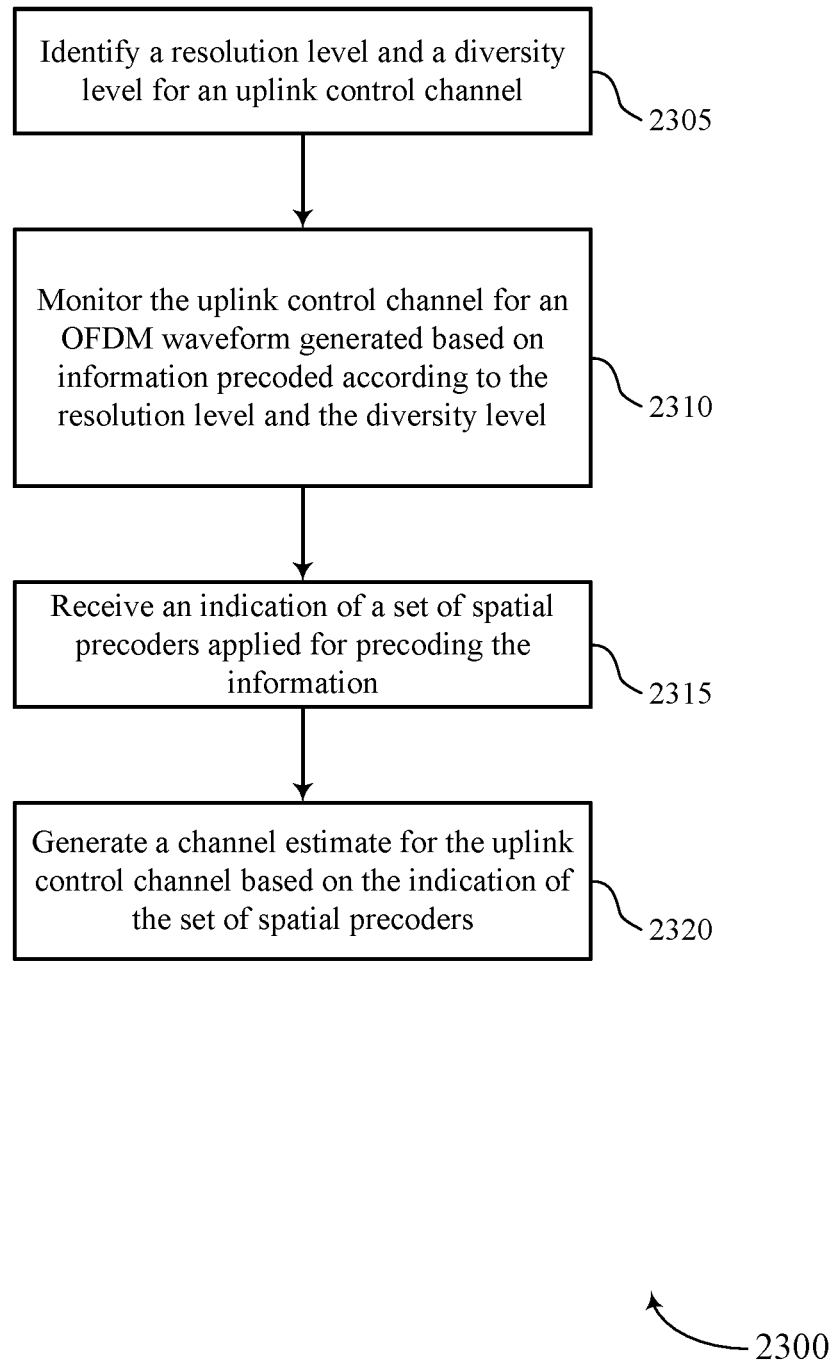

FIG. 23 shows a flowchart illustrating a method 2300 that supports transmission diversity enhancement for uplink control channel in accordance with aspects of the present disclosure. The operations of method 2300 may be implemented by a base station 105 or its components as described herein. For example, the operations of method 2300 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2305, the base station may identify a resolution level and a diversity level for an uplink control channel. The operations of 2305 may be performed according to the methods described herein. In some examples, aspects of the operations of 2305 may be performed by a transmit diversity manager as described with reference to FIGS. 11 through 14.

At 2310, the base station may monitor the uplink control channel for an OFDM waveform generated based on information precoded according to the resolution level and the diversity level. The operations of 2310 may be performed according to the methods described herein. In some examples, aspects of the operations of 2310 may be performed by a channel monitor as described with reference to FIGS. 11 through 14.

At 2315, the base station may receive an indication of a set of spatial precoders applied for precoding the information. The operations of 2315 may be performed according to the methods described herein. In some examples, aspects of the operations of 2315 may be performed by an indication receiver as described with reference to FIGS. 11 through 14.

At 2320, the base station may generate a channel estimate for the uplink control channel based on the indication of the set of spatial precoders. The operations of 2320 may be performed according to the methods described herein. In some examples, aspects of the operations of 2320 may be performed by a channel estimator as described with reference to FIGS. 11 through 14.

Embodiment 1: A method for wireless communications at a user equipment (UE), comprising: identifying a resolution level and a diversity level for an uplink control channel; precoding information for transmission via the uplink control channel based at least in part on the resolution level and the diversity level; and transmitting, via the uplink control channel, an orthogonal frequency division multiplexing (OFDM) waveform generated based at least in part on the precoded information.

Embodiment 2: The method of embodiment 1, wherein precoding the information for transmission further comprises: identifying a plurality of control channel payload resource element groups within a resource block based at least in part on the resolution level and the diversity level; and applying a different spatial precoder to a respective subset of the information that is mapped to a respective control channel payload resource element group of the plurality of control channel payload resource element groups.

Embodiment 3: The method of embodiment 2, further comprising: identifying, based at least in part on the diversity level, a number of the plurality of control channel payload resource element groups within the resource block; and generating the OFDM waveform based at least in part on the number.

Embodiment 4: The method of any of embodiments 2 to 3, further comprising: identifying, based at least in part on the resolution level, a mapping pattern that indicates that resource elements of different groups of the plurality of control channel payload resource element groups are interleaved within the resource block; and generating the OFDM waveform based at least in part on the mapping pattern.

Embodiment 5: The method of any of embodiments 2 to 4, further comprising: identifying, based at least in part on the resolution level, a mapping pattern that indicates that resource elements of different groups of the plurality of control channel payload resource element groups are mapped to distinct sets of contiguous resource elements within the resource block; and generating the OFDM waveform based at least in part on the mapping pattern.

Embodiment 6: The method of any of embodiments 1 to 5 wherein precoding the information for transmission further comprises: precoding a first subset of the information that is mapped to a first control channel payload resource element group of a plurality of control channel payload resource element groups within a resource block using a first spatial precoder of a plurality of spatial precoders; and precoding a second subset of the information that is mapped to a second control channel payload resource element group of the plurality of control channel payload resource element groups using a second spatial precoder of the plurality of spatial precoders that differs from the first spatial precoder.

Embodiment 7: The method of any of embodiments 1 to 6, further comprising: identifying a number of demodulation reference signal ports based at least in part on the diversity level; identifying, based at least in part on the number of demodulation reference signal ports, a mapping pattern that maps at least one demodulation reference signal to at least one resource element within each control channel payload resource element group of a plurality of control channel payload resource element groups within a resource block; and generating the OFDM waveform based at least in part on the mapping pattern.

Embodiment 8: The method of any of embodiments 1 to 7, further comprising: determining a precoding pattern for a set of demodulation reference signals within each control channel payload resource element group of a plurality of control channel payload resource element groups based at least in part on the resolution level; and generating the OFDM waveform based at least in part on the precoding pattern.

Embodiment 9: The method of any of embodiments 1 to 8, wherein identifying the resolution level and the diversity level further comprises: receiving an indication of the resolution level and the diversity level.

Embodiment 10: The method of embodiment 9, wherein the indication is received via a radio resource control (RRC) message, downlink control information (DCI), or a physical downlink control channel (PDCCH).

Embodiment 11: The method of any of embodiments 1 to 10, wherein the uplink control channel is a physical uplink control channel (PUCCH).

Embodiment 12: The method of any of embodiments 1 to 11, further comprising: identifying a cycling pattern for the uplink control channel; and generating the OFDM waveform for transmission over a plurality of transmission time intervals based at least in part on the cycling pattern.

Embodiment 13: The method of embodiment 12, wherein identifying the cycling pattern further comprises: receiving an indication of the cycling pattern.

Embodiment 14: The method of any of embodiments 12 to 13, wherein precoding the information further comprises: cycling, based at least in part on the cycling pattern, which spatial precoder of a plurality of different spatial precoders is mapped to a respective control channel payload resource element group of a plurality of control channel payload resource element groups in each transmission time interval of the plurality of transmission time intervals.

Embodiment 15: The method of any of embodiments 12 to 14, wherein the cycling pattern is a time domain cycling pattern, a frequency domain cycling pattern, or a time and frequency domain cycling pattern.

Embodiment 16: The method of any of embodiments 1 to 15, wherein: transmitting the OFDM waveform comprises: transmitting the OFDM waveform in a single transmission time interval or two transmission time intervals.

Embodiment 17: The method of any of embodiments 1 to 16, further comprising: identifying an uplink control channel format for the uplink control channel; and generating the OFDM waveform based at least in part on the uplink control channel format.

Embodiment 18: The method of embodiment 17, wherein identifying the uplink control channel format for the uplink control channel comprises: receiving an indication of the uplink control channel format.

Embodiment 19: The method of any of embodiments 1 to 18, further comprising: transmitting an indication of a plurality of spatial precoders applied for precoding the information.

Embodiment 20: A method for wireless communications at a base station, comprising: identifying a resolution level and a diversity level for an uplink control channel; and monitoring the uplink control channel for an orthogonal frequency division multiplexing (OFDM) waveform generated based at least in part on information precoded according to the resolution level and the diversity level.

Embodiment 21: The method of embodiment 20, further comprising: transmitting an indication of the resolution level and the diversity level.

Embodiment 22: The method of embodiment 21, wherein the indication is transmitted via a radio resource control (RRC) message, downlink control information (DCI), or a physical downlink control channel (PDCCH).

Embodiment 23: The method of either of embodiments 20 to 22, wherein the uplink control channel comprises a physical uplink control channel (PUCCH).

Embodiment 24: The method of any of embodiments 20 to 23, further comprising: transmitting an indication of a cycling pattern for the uplink control channel, wherein monitoring of the uplink control channel for the OFDM waveform is based at least in part on the cycling pattern.

Embodiment 25: The method of embodiment 24, wherein the cycling pattern is a time domain cycling pattern, a frequency domain cycling pattern, or a time and frequency domain cycling pattern.

Embodiment 26: The method of any of embodiments 20 to 25 further comprising: identifying a cycling pattern for the uplink control channel; and receiving the OFDM waveform over a set of transmission time intervals based at least in part on the cycling pattern.

Embodiment 27: The method of embodiment 26, further comprising: determining, based at least in part on the cycling pattern, which spatial precoder of a plurality of different spatial precoders is mapped to a respective control channel payload resource element group of a plurality of control channel payload resource element groups in each transmission time interval of the set of transmission time intervals.

Embodiment 28: The method of any of embodiments 20 to 27, wherein monitoring the uplink control channel for the OFDM waveform comprises: monitoring a single transmission time interval or two transmission time intervals for the OFDM waveform.

Embodiment 29: The method of any of embodiments 20 to 28 further comprising: transmitting an indication of an uplink control channel format, wherein the monitoring of the uplink control channel for the OFDM waveform is based at least in part on the uplink control channel format.

Embodiment 30: The method of any of embodiments 20 to 29, further comprising: receiving an indication of a plurality of spatial precoders applied for precoding the information; and generating a channel estimate for the uplink control channel based at least in part on the indication of the plurality of spatial precoders.

Embodiment 31: An apparatus for wireless communications at a UE comprising a processor; memory in electronic communication with the processor; and instructions stored in the memory and executable by the processor to cause the apparatus to perform a method of any of embodiments 1 to 19.

Embodiment 32: An apparatus for wireless communications at a base station comprising a processor; memory in electronic communication with the processor; and instructions stored in the memory and executable by the processor to cause the apparatus to perform a method of any of embodiments 20 to 30.

Embodiment 33: An apparatus at a UE comprising at least one means for performing a method of any of embodiments 1 to 19.

Embodiment 34: An apparatus at a base station comprising at least one means for performing a method of any of embodiments 20 to 30.

Embodiment 35: A non-transitory computer-readable medium storing code for wireless communication by a UE, the code comprising instructions executable by a processor to cause the processor to perform a method of any of embodiments 1 to 19.

Embodiment 36: A non-transitory computer-readable medium storing code for wireless communication by a base station, the code comprising instructions executable by a processor to cause the processor to perform a method of any of embodiments 20 to 30.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying a resolution level indicating a quantity of subsets of resource elements per resource block, and a diversity level for an uplink control channel;
   precoding information for transmission via the uplink control channel based at least in part on the resolution level and the diversity level, wherein precoding the information further comprises:
   identifying a plurality of control channel payload resource element groups within a resource block based at least in part on the resolution level and the diversity level; and
   applying a different spatial precoder to a respective subset of the information that is mapped to a respective control channel payload resource element group of the plurality of control channel payload resource element groups; and
   transmitting, via the uplink control channel, an orthogonal frequency division multiplexing (OFDM) waveform generated based at least in part on the precoded information.

2. The method of claim 1, further comprising:
   identifying, based at least in part on the diversity level, a number of the plurality of control channel payload resource element groups within the resource block; and
   generating the OFDM waveform based at least in part on the number.

3. The method of claim 1, further comprising:
   identifying, based at least in part on the resolution level, a mapping pattern that indicates that resource elements of different groups of the plurality of control channel payload resource element groups are interleaved within the resource block; and
   generating the OFDM waveform based at least in part on the mapping pattern.

4. The method of claim 1, further comprising:
   identifying, based at least in part on the resolution level, a mapping pattern that indicates that resource elements of different groups of the plurality of control channel payload resource element groups are mapped to distinct sets of contiguous resource elements within the resource block; and
   generating the OFDM waveform based at least in part on the mapping pattern.

5. The method of claim 1, wherein precoding the information for transmission further comprises:
   precoding a first subset of the information that is mapped to a first control channel payload resource element group of the plurality of control channel payload resource element groups within the resource block using a first spatial precoder of a plurality of spatial precoders; and
   precoding a second subset of the information that is mapped to a second control channel payload resource element group of the plurality of control channel payload resource element groups using a second spatial precoder of the plurality of spatial precoders that differs from the first spatial precoder.

6. The method of claim 1, further comprising:
   identifying a number of demodulation reference signal ports based at least in part on the diversity level;
   identifying, based at least in part on the number of demodulation reference signal ports, a mapping pattern that maps at least one demodulation reference signal to at least one resource element within each control channel payload resource element group of the plurality of control channel payload resource element groups within the resource block; and
   generating the OFDM waveform based at least in part on the mapping pattern.

7. The method of claim 1, further comprising:
   determining a precoding pattern for a set of demodulation reference signals within each control channel payload resource element group of the plurality of control channel payload resource element groups based at least in part on the resolution level; and
   generating the OFDM waveform based at least in part on the precoding pattern.

8. The method of claim 1, wherein identifying the resolution level and the diversity level further comprises:
   receiving an indication of the resolution level and the diversity level via a radio resource control (RRC) message, downlink control information (DCI), or a physical downlink control channel (PDCCH).

9. The method of claim 1, wherein the uplink control channel is a physical uplink control channel (PUCCH).

10. The method of claim 1, further comprising:
    identifying a cycling pattern for the uplink control channel; and
    generating the OFDM waveform for transmission over a plurality of transmission time intervals based at least in part on the cycling pattern.

11. The method of claim 10, wherein identifying the cycling pattern further comprises:
    receiving an indication of the cycling pattern.

12. The method of claim 10, wherein precoding the information further comprises:

cycling, based at least in part on the cycling pattern, which spatial precoder of a plurality of different spatial precoders is mapped to the respective control channel payload resource element group of the plurality of control channel payload resource element groups in each transmission time interval of the plurality of transmission time intervals.

13. The method of claim 10, wherein the cycling pattern is a time domain cycling pattern, a frequency domain cycling pattern, or a time and frequency domain cycling pattern.

14. The method of claim 1, wherein transmitting the OFDM waveform comprises:
transmitting the OFDM waveform in a single transmission time interval or two transmission time intervals.

15. The method of claim 1, further comprising:
identifying an uplink control channel format for the uplink control channel; and
generating the OFDM waveform based at least in part on the uplink control channel format.

16. The method of claim 15, wherein identifying the uplink control channel format for the uplink control channel comprises:
receiving an indication of the uplink control channel format.

17. The method of claim 1, further comprising:
transmitting an indication of a plurality of spatial precoders applied for precoding the information.

18. A method for wireless communications at a base station, comprising:
identifying a resolution level indicating a quantity of subsets of resource elements per resource block, and a diversity level for an uplink control channel;
monitoring the uplink control channel for an orthogonal frequency division multiplexing (OFDM) waveform generated based at least in part on information precoded according to the resolution level and the diversity level;
identifying a cycling pattern for the uplink control channel;
receiving the OFDM waveform over a set of transmission time intervals based at least in part on the cycling pattern; and
determining, based at least in part on the cycling pattern, which spatial precoder of a plurality of different spatial precoders is mapped to a respective control channel payload resource element group of a plurality of control channel payload resource element groups in each transmission time interval of the set of transmission time intervals.

19. The method of claim 18, further comprising:
transmitting an indication of the resolution level and the diversity level via a radio resource control (RRC) message, downlink control information (DCI), or a physical downlink control channel (PDCCH).

20. The method of claim 18, wherein the uplink control channel comprises a physical uplink control channel (PUCCH).

21. The method of claim 18, further comprising:
transmitting an indication of a cycling pattern for the uplink control channel, wherein monitoring of the uplink control channel for the OFDM waveform is based at least in part on the cycling pattern.

22. The method of claim 21, wherein the cycling pattern is a time domain cycling pattern, a frequency domain cycling pattern, or a time and frequency domain cycling pattern.

23. The method of claim 18, wherein monitoring the uplink control channel for the OFDM waveform comprises:
monitoring a single transmission time interval or two transmission time intervals for the OFDM waveform.

24. The method of claim 18, further comprising:
transmitting an indication of an uplink control channel format, wherein the monitoring of the uplink control channel for the OFDM waveform is based at least in part on the uplink control channel format.

25. The method of claim 18, further comprising:
receiving an indication of a plurality of spatial precoders applied for precoding the information; and
generating a channel estimate for the uplink control channel based at least in part on the indication of the plurality of spatial precoders.

26. An apparatus for wireless communications at a user equipment (UE), comprising:
a processor,
memory in electronic communication with the processor; and
instructions stored in the memory and executable by the processor to cause the apparatus to:
identify a resolution level indicating a quantity of subsets of resource elements per resource block, and a diversity level for an uplink control channel;
identify a cycling pattern for the uplink control channel;
generate an orthogonal frequency division multiplexing (OFDM) waveform for transmission over a plurality of transmission time intervals based at least in part on the cycling pattern;
precode information for transmission via the uplink control channel based at least in part on the resolution level and the diversity level, the precode further comprising a cycling, based at least in part on the identified cycling pattern for the uplink control channel, of which spatial precoder of a plurality of different spatial precoders is mapped to a respective control channel payload resource element group of a plurality of control channel payload resource element groups in each transmission time interval of the plurality of transmission time intervals; and
transmit, via the uplink control channel, the OFDM waveform generated based at least in part on the precoded information.

27. An apparatus for wireless communications at a base station, comprising:
a processor,
memory in electronic communication with the processor; and
instructions stored in the memory and executable by the processor to cause the apparatus to:
identify a resolution level indicating a quantity of subsets of resource elements per resource block, and a diversity level for an uplink control channel;
monitor the uplink control channel for an orthogonal frequency division multiplexing (OFDM) waveform generated based at least in part on information precoded according to the resolution level and the diversity level;
identify a cycling pattern for the uplink control channel;
receive the OFDM waveform over a set of transmission time intervals based at least in part on the cycling pattern; and
determine, based at least in part on the cycling pattern, which spatial precoder of a plurality of different spatial precoders is mapped to a respective control channel payload resource element group of a plurality of control channel payload resource element groups in each transmission time interval of the set of transmission time intervals.

\* \* \* \* \*